United States Patent Office 2,907,728
Patented Oct. 6, 1959

2,907,728

COMPOSITIONS OF DIPHENOLIC ACID CO-AMIDES AND POLYEPOXIDES

Sylvan O. Greenlee, Racine, Wis., assignor to S. C. Johnson & Son, Inc., Racine, Wis.

No Drawing. Application March 15, 1957
Serial No. 646,222

20 Claims. (Cl. 260—19)

This invention relates to new products and compositions resulting from the reaction of polyepoxides with co-amides and the modification of such compositions with condensates of aldehydes and ammonia derivatives or condensates of aldehydes and phenols in regulated proportions to produce valuable compositions useful in the manufacture of varnishes, molding compositions, adhesives, films, and molded objects. More particularly, the co-amides are the reaction products of a bis(hydroxyaryl)-alkylidene monocarboxylic acid and at least one modifying organic acid with a polyamine. The invention includes initial mixtures or compositions as well as intermediate and final reaction products and methods for their production.

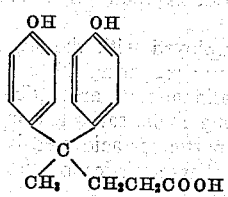
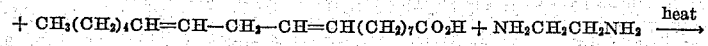

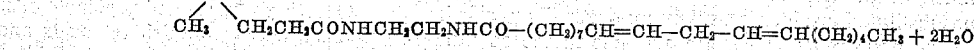

It is an object of this invention to produce new compositions of matter from suitable proportions of co-amides and polyepoxides or said compositions modified with aldehyde condensates, yielding compositions which are suitable for use in molding objects, protective coatings, and adhesives.

Another object of this invention is the production of reaction mixtures of the aforesaid epoxides and co-amides with or without modification with aldehyde condensates which are capable of reaction on the application of heat to form infusible, insoluble products.

Another object of this invention is the production of new reaction mixtures as described above which are stable at room temperature for long periods of time and which may be converted to insoluble, infusible products by the application of heat with or without the addition of catalyst.

Another object of this invention is the production of co-conversion products of polyepoxides and co-amides, aforesaid products modified with aldehyde condensates with such co-conversion products being characterized by extreme hardness, flexibility, resistance to water, alkali, and organic solvents.

Other objects of this invention will appear from the following more detailed description with particular reference to the illustrative examples.

From the prior art it is known that in the preparation of insoluble, infusible polymeric compositions, a major problem is to obtain a product which is sufficiently hard yet which retains the necessary flexibility and toughness. Polyepoxides have been receiving increased attention in the manufacture of these polymeric compositions mainly because of such characteristics as their reactivity with a large number of ingredients, such as the active hydrogen-containing compounds of sulfur, nitrogen, and oxygen, their small shrinkage, and their property of hardening usually without the evolution of volatiles. To these valuable fundamental properties can be added their practical convenience and the wide range of properties available by suitable choice of the type of epoxide. In the manufacture of polyepoxide compositions, one of the major problems encountered has continued to be the proper selection of a coreactant which will give the necessary conversion to infusibility and still remain flexible and tough.

In this invention a new and unique series of coreactants will be demonstrated. These coreactants readily convert an epoxide and provide, in addition, a plasticizer which is chemically linked by a primary bond, thus eliminating the possibility of plasticizer migration or volatilization. The new compositions comprise the reaction product of a novel organic acid, bis(hydroxyaryl)alkylidene monocarboxylic acid, and a modifying organic acid with a polyamine. An example of such a composition is the reaction product of 4,4-bis(4-hydroxyphenyl)pentanoic acid, linoleic acid, and ethylenediamine.

It can be readily seen from the proposed structure and configuration of the above composition that the necessary polyfunctionality for epoxide conversion is readily available. The active hydrogen of the phenolic hydroxyl groups, contributed by the Diphenolic Acid, will conveniently convert an epoxide as will the hydrogen attached to the nitrogen atom, provided a primary amine is employed. When a secondary amine is used, no available active hydrogen from the amine is present, except in instances where the polyamine is used in slight excess. Such a variation can be particularly valuable if additional conversion characteristics are desired. In addition to conversion characteristics, a means of plasticizing is available, if needed, through the proper selection of the modifying organic acid. The modifying organic acid can, in addition, be used to provide air-drying or heat-converting characteristics through the selection of an unsaturated acid. It has further been observed that in the preparation of these polymeric products, aldehyde condensates of phenols and ammonia derivatives can be advantageously employed in some instances to modify the polyepoxide and co-amide compositions, with the condensates providing improvement in such properties as flexibility, hardness, and water and chemical resistance.

In general, the epoxides contemplated for use with the co-amides are compounds containing an average of more than 1 up to about 20 epoxide groups per molecule. Such compounds, free from functional groups other than epoxide, carboxyl, and hydroxyl groups, are reacted with active hydrogen containing groups such as hydroxyl groups and amino or amide groups supplied by the co-amide herein contemplated. Typical epoxides which have been found to be operable are complex resinous polyepoxides, resinous polyepoxide, polyesters, epoxidized natural oils, and simple aliphatic polyepoxides.

The reaction products of this invention are prepared by converting the epoxide groups with the co-amides which are derivatives of bis(hydroxyaryl)substituted aliphatic acids, modifying organic acids, and polyamines, and if desired, modifying such composition with aldehyde condensates. Conversion of the epoxide groups is effected by active hydrogen present in the phenolic hydroxyl, methylol, and amino or amide groups which are supplied by the other reactants.

The hydroxyaryl-substituted alkylidene carboxylic acid contemplated for use herein should have two hydroxyaryl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid should be positioned next to a terminal methyl group in order to obtain satisfactory yields. Prior applications, Serial Nos. 464,607 and 489,300, filed October 25, 1954, and February 18, 1955, respectively, disclose a number of illustrative compounds suitable for use as the Diphenolic Acid and methods of preparing the same. Those materials, which are referred to for convenience as diphenolic acids or DPA, consist of the condensation products of levulinic acid and phenol, substituted phenols, or mixtures thereof. It is to be understood that the phenolic nuclei of the Diphenolic Acid may be substituted with any groups which will not interfere with the reactions contemplated herein. For example, the nuclei may be alkylated with alkyl groups of from 1–5 carbon atoms as disclosed in my above mentioned copending application Serial No. 489,300 or they may be halogenated. The Diphenolic Acid derived from substituted phenols, such as the alkylated phenols, are sometimes more desirable than the products obtained from unsubstituted phenols since the alkyl groups provide better organic solvent solubility, flexibility, and water resistance. However, the unsubstituted product is usually more readily purified.

The polyamines which are operable in the co-amidification process for preparing the co-amides, include the aliphatic or aromatic compounds, substituted with other functional groups or unsubstituted. It is necessary that the amines used contain at least two primary or secondary amine groups. The primary amines which will retain an active hydrogen atom attached to the nitrogen after reaction with the carboxyl group are particularly valuable in instances where additional epoxide conversion sites are needed. The substituted materials contemplated for use are those which contain functional groups which would not interfere with the reactions of the Diphenolic Acid through its carboxyl group. For example, polyamines containing a carboxyl group such as diaminobenzoic acid would not be particularly well suited since the amidification of the Diphenolic Acid would be competing with the amidification of the benzoic acid carboxyl group. Amine ethers or hydroxylamines are examples of suitable substituted compounds. Operable aliphatic amines may have a wide variation in molecular weight. Illustrative low molecular weight polyamines are ethylenediamine, triethylenediamine, propylenediamine-1,2, tetramethylenediamine, hexamethylenediamine, diethylenetriamine, and triethylenetetramine. These amines are conveniently prepared by the reaction of ammonia with alkyl halides or by reacting glycols with ammonia in the presence of a contact catalyst. The primary, secondary, and tertiary amines being conveniently separated by boiling point differences or by extraction. These low molecular weight aliphatic polyamines are usually obtained commercially as aqueous solutions and are conveniently used in this reaction as such, thus eliminating the necessity of stripping off water before use. The high molecular weight polyamines are usually prepared from polymerized fatty acids such as linseed oil fatty acid, or from the higher molecular weight glycols. The dimer acids of long chain fatty acids such as soyabean and linseed oil are probably the most important source of the high molecular weight polyamines.

Operable aromatic polyamines are the mononuclear, nonfused polynuclear, and fused polynuclear polyamines. Many of the first two types may be described as phenylenediamines wherein two of the aromatic hydrogens are replaced by amine groups or organic radicals containing the same. Illustrative compounds are p-phenylenediamine, aminobenzylphenyleneamine, tri(p-aminophenyl) methane, and diaminodiphenylamine. Other nonfused compounds include those having more than two of the aromatic hydrogens replaced by amine groups or other radicals, e.g. toluene-2,4-diamine, 3,3'-bitolylene-4,4'-diamine.

The characteristics of the final co-amides of this invention can be varied to a large extent by the selection of the polyamine to be used. For example, if a long chain polyamine is used, the resultant product would be more flexible than if a short chain or aromatic polyamine were used, or such an amine as ethylenediamine would give a less complex reaction product than would tetramethylenepentamine. Aromatic polyamines also usually give somewhat higher melting products than aliphatic polyamines.

The modifying organic acids employed with the hydroxyaryl-substituted aliphatic acids in preparing the co-amides include a wide range of aliphatic or aromatic, resinous or nonresinous, short or long chain, saturated or unsaturated carboxylic acids. The particular acid used is another variable determining the characteristics of the final polymeric product.

Self-plasticized compositions, which in addition have air-drying characteristics, may be prepared by employing as the modifying organic acid the drying oil fatty acids. These acids normally contain from about 18 to 22 carbon atoms and are obtained by saponification of naturally occurring unsaturated vegetable oils. Other acids may be illustrated by the fish oil acids and the shorter chained unsaturated acid undecanoic acid, which is a decomposition product of castor oil acids. Low molecular weight unsaturated acids may also be used if only air-drying or heat-converting characteristics are desired since the plasticization effect of the low molecular weight materials is less significant. Examples of such acids are crotonic and sorbic acid.

Saturated monocarboxylic aliphatic acids may also be used in the production of co-amides. Such acids offer a convenient means for regulating the plasticity of the resulting product. Suitable acids of this type are found in the spectrum ranging from acetic, and decanoic, through stearic acid. In general, the longer chain acids, having more than about 10 carbon atoms, are usually the most effective plasticizers. The long chain unsaturated acids may be obtained by saponification of the vegetable and fish oil acids, the unsaturated acids being first hydrogenated to remove the unsaturation. Longer chain saturated acids, containing from about 20 to more than 36 carbon atoms, may be obtained by the saponification of naturally occurring waxes or by chemical synthesis, using the so-called Oxo process.

Resinous acids are also advantageously employed in some instances for preparing the co-amides. For example, rosin acids can be used in the preparation of polymeric products to impart hardness, gloss, and other resinous characteristics. Aromatic acids may also be used as valuable modifying organic acids and may be illustrated by such materials as benzoic acid, butylbenzoic acid, phthalic acid, naphthoic acid, and phenoxyacetic acids. These acids are useful in imparting rigidity, hardness, and toughness to the polymeric products derived therefrom. The modifying acids used in the preparation of co-amides also include the dicarboxylic acids such as succinic, azelaic, sebacic, and longer chain acids such as the 36 carbon acids prepared by dimerizing unsaturated vegetable oil acids. In the preparation of the co-amides from the polyamines, hydroxyaryl-substituted acids, and modifying organic acids the reactants may be used in varying proportions of wide ranges.

In preparing the co-amides, the ratios of acid to polyamine may be adjusted so that substantially equivalent amounts of carboxyl and amino groups are present in the mixture. Such compositions have been found to be particularly valuable. It has further been observed that it may be desirable in some instances to use an excess of polyamine in order to obtain added conversion characteristics. For example, in a composition where the polyamine is diethylenetriamine, it may be desirable to react only one active hydrogen of each primary amino group, in this manner leaving free three active hydrogens attached to nitrogen atoms to aid in conversion of the epoxide. In other instances, it may be desirable to react substantially all of the amino groups allowing the conversion characteristics to be imparted by the phenolic hydroxyl groups of the Diphenolic Acid or through the unsaturation of the modifying acid.

Similarly, the ratio of hydroxyaryl-substituted acid to the modifying organic acid may be proportioned within relatively wide ranges. Good products can be obtained, for example, when the equivalent ratio of hydroxyaryl-substituted acid to modifying organic acid ranges from about 1:6 and 6:1. The particular ratio employed, of course, would depend upon the choice of acids used and the modifications desired in the reaction mixtures and polymeric materials prepared from the co-amides.

The co-amides used herein may be conveniently prepared by the methods of amidification well known in the art. In general, the co-amides described are prepared by heating the Diphenolic Acid and the modifying organic acid with a polyamine. In certain instances it may be desirable to use a simple ester of the desired acid depending usually on which material is most economically available. In instances where the polyamine is sufficiently high boiling so as not to volatilize during heat treatment, the co-amidification is conveniently accomplished by heating the polyamine with either the acid or its ester at temperatures up to about 225–250° C. In such reactions, the removal of water or alcohol formed during co-amidification is facilitated by azeotropic distillation with a hydrocarbon solvent or by passing a stream of inert gas over the reaction mixture. If a nonvolatile polyhydric alcohol is encountered, liberated through the reaction of a polyamine with an ester such as glyceride, such an alcohol may be conveniently removed by a water-washing process.

The order of addition of the various ingredients, Diphenolic Acid, modifying organic acid, and polyamine to each other may be varied. It is sometimes advantageous to vary the order of reaction to obtain optimum results with a particular combination of ingredients used.

Examples 1 through 12, inclusive, describe the preparation of a selective group of co-amides. The proportions given are expressed as parts by weight unless otherwise indicated. Acid values represent the number of milligrams of KOH required to neutralize a 1-gram sample. Amine values represent the number of milligrams of HCl required to neutralize a 1-gram sample. The amine and acid values were determined by electrometric titration. Softening points were determined by Durrans' Mercury method (Journal of Oil and Color Chemists' Association 12, 173–175 [1929]).

EXAMPLE 1

A mixture of 143 parts of 4,4-bis(4-hydroxyphenyl)-pentanoic acid, 45 parts of ethylenediamine (85% amine and 15% water), and 140 parts of linseed oil fatty acids was heated at 100° C. for a period of 1 hour. The reflux condenser was changed in order to collect the distillate. The reaction mixture was heated at 104–110° C. for 35 minutes and gradually raised to 205° C. at which temperature it was held for an additional 15 minutes. The residual product, amounting to 281 parts, had an amine value of 26.8, an acid value of 30, and a softening point of 87° C.

EXAMPLE 2

A mixture of 572 parts of 4,4-bis(4-hydroxyphenyl)-pentanoic acid and 173 parts ethylenediamine (69% ethylenediamine content) was heated at 100° C. for 4 hours. The condenser was changed in order to collect the distillate and the temperature gradually increased to 158° C. and held at this temperature for a period of 1 hour. At this point the product, amounting to 645 parts, has an amine value of 184. To this molten mixture was added 556 parts of oleic acid and the resulting mixture heated for a period of 1 hour at 135° C. The temperature was then gradually increased to 258° C. to give 1160 parts of a product having an amine value of 4.5, an acid value of 20, and a softening point of 70° C.

EXAMPLE 3

A mixture of 572 parts of 4,4-bis(4-hydroxyphenyl)-pentanoic acid and 173 parts of ethylenediamine (69% ethylenediamine content) was heated at 100° C. for 4 hours. The condenser was changed in order to collect the distillate and the temperature gradually raised to 158° C. at which temperature it was held for 1 hour. This intermediate product, amounting to 645 parts and having an amine value of 184, was treated with 213 parts of Petrex Acid (a resinous terpene polycarboxylic acid having an acid value of 515–535, a softening point of 45–52° C., and marketed by the Hercules Powder Company). The reaction mixture was gradually heated to 235° C. and held at 235–250° C. for 15 minutes. The product, amounting to 203 parts, had an amine value of 31.7, an acid value of 0, and a softening point of 122° C.

EXAMPLE 4

A mixture of 178 parts of p-tert-butylbenzoic acid and 87 parts of ethylenediamine (69%) was heated at 115–120° C. for a period of 1 hour, after which 286 parts of 4,4-bis(4-hydroxyphenyl)pentanoic acid were added and the temperature held at 120° C. for a period of 1 hour. After changing the condenser in order to collect the distillate, the temperature was gradually raised to 230° C. and held at 230–245° C. for a period of 1 hour. The residual product, amounting to 482 parts, had an amine value of 30.7, an acid value of 17.8, and a softening point of 135° C.

EXAMPLE 5

A mixture of 86 parts of crotonic acid and 87 parts of ethylenediamine (69%) was heated at 130° C. for a period of 1 hour, after which 286 parts of 4,4-bis(4-hydroxyphenyl)pentanoic acid were added and the reaction mixture then heated for 40 minutes at 120° C. The condenser was changed in order to collect the distillate and the temperature was raised to 230° C. over a period of 40 minutes. The residual product, amounting to 387 parts, had an amine value of 22.2, an acid value of 0, and a softening point of 141° C.

EXAMPLE 6

A mixture of 143 parts of 4,4-bis(4-hydroxyphenyl) pentanoic acid and 87 parts of propylenediamine (85%) was heated to 130° C. over a period of 35 minutes after which 140 parts of linseed oil fatty acids were added.

After heating for 25 minutes at 125–130° C., the condenser was changed in order to collect the distillate and the temperature raised to 210° C. and held at 210–225° C. for 1½ hours. The pressure in the reaction vessel was reduced to 20 mm. and the heating continued for 25 minutes at 225–270° C. The residual product, amounting to 247 parts, had an acid value of 0, an amine value of 24, and a softening point of 66° C.

EXAMPLE 7

A mixture of 143 parts of 4,4-bis(4-hydroxyphenyl) pentanoic acid and 87 parts of propylenediamine (85%) was heated to 130° C. over a period of 35 minutes, after which 142 parts of oleic acid were added. The reaction mixture was held at 130° C. for 25 minutes. The condenser was changed in order to collect the distillate, after which the temperature was gradually raised to 190° C. and held at 190–220° C. for 1¾ hours. The pressure was reduced to 20 mm. and the reaction mixture heated for an additional 25 minutes at 220–268° C. The residual product, amounting to 283 parts, had an amine value of 17.8, an acid value of 1.6, and a softening point of 72° C.

EXAMPLE 8

A mixture of 143 parts of 4,4-bis(4-hydroxyphenyl) pentanoic acid and 83 parts of hexamethylenediamine (70%) was heated to 120° C. and held at 120–130° C. for 2¼ hours, after which 140 parts of soyabean oil fatty acids were added. The condenser was changed in order to collect the distillate and the reaction mixture gradually heated to 210° C. over a period of 15 minutes. The reaction mixture was held at 210–235° C. for a period of 1 hour. After reducing the pressure to approximately 20 mm., heating was continued for a period of 1 hour at 230–237° C. The residual product, amounting to 318 parts, had an amine value of 18, an acid value of 0, and a softening point of 80° C.

EXAMPLE 9

A mixture of 143 parts of 4,4-bis(4-hydroxyphenyl) pentanoic acid and 44 parts of ethylenediamine (69%) was heated for a period of 1 hour at 116–130° C., after which 170 parts of resin were added. The reaction mixture was heated for a period of 30 minutes at 122° C. and the condenser changed in order to collect the distillate. The temperature was then raised to 230° C. over a period of 30 minutes, after which the pressure was reduced to 20 mm. and heating continued at 230–245° C. for a period of 4 hours. The residual product, amounting to 275 parts, had an acid value of 10, an amine value of 0, and a softening point of 134° C.

EXAMPLE 10

A mixture of 258 parts of 4,4-bis(4-hydroxyphenyl) pentanoic acid and 73 parts of triethylenetetramine was charged to a reaction flask and heated to 130° C. and the temperature increased to 200° C. over a period of 4½ hours, after which 30 parts of oleic acid were added and the reaction continued an additional 13 hours at 180–190° C. The residual product, amounting to 300 parts had an acid value of 0, an amine value of 88.7 and a softening point of 95° C.

EXAMPLE 11

A mixture of 31 parts of 4,4-bis(4-hydroxy-3 methylphenyl)pentanoic acid, 254 parts of soya fatty acids and 54 parts para-phenylenediamine was charged to a reaction flask and heated to 190° C. and held at this temperature for a period of 13½ hours. The resulting product, amounting to 292 parts, had an acid value of 0, an amine value of 1, and a softening point of 141° C.

EXAMPLE 12

A mixture of 86 parts of 4,4-bis(4-hydroxyphenyl) pentanoic acid, 214 parts rapeseed acid, and 99 parts, p,p'-methylenedianiline was charged to a reaction flask and heated to a temperature of 180° C. and held between 180–185° C. for a period of 12 hours. The resultant product, amounting to 350 parts, had an acid value of 0, an amine value of 2, and a softening point of 101.5° C.

Illustrative of the epoxide compositions which may be employed in this invention are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and nuclei connected to each other by ether linkages, containing terminal epoxide groups and free from functional groups other than epoxide and hydroxyl groups. It should be understood that significant amounts of the monomeric reaction products are often present. This would be illustrated by II to IV below where $n$ equals zero. Preparation of these epoxide materials as well as illustrative examples are described in U.S. Patents 2,456,408, 2,503,726, 2,615,007, 2,615,008, 2,668,807, 2,688,805, and 2,698,315. Well-known commercial examples of these resins are the Epon resins marketed by the Shell Chemical Corporation. Illustrative of the preparation of these epoxide resins are the following reactions wherein the difunctional coupling agent is used in varying molar excessive amounts:

Polyhydric phenol and an epihalohydrin bis(hydroxyphenyl)isopropylidene + excess epichlorohydrin

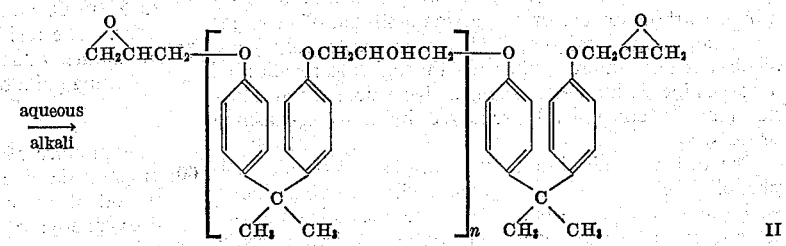

Polyhydric phenol and a polyepoxide bis(hydroxyphenyl)isopropylidene + excess butylene dioxide

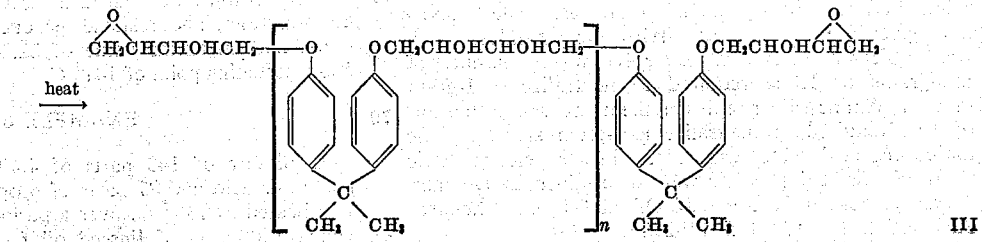

Polyhydric phenol and a polyhalohydrin bis(hydroxyphenyl)isopropylidene + excess alpha-glycerol dichlorohydrin

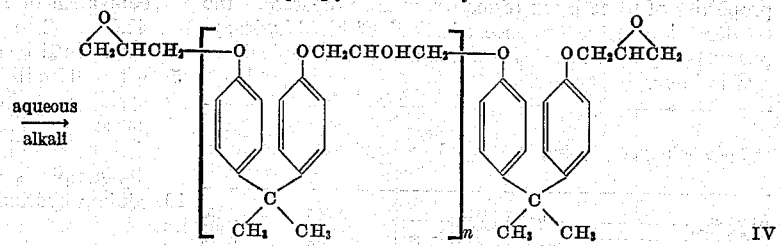

$$\xrightarrow{\text{aqueous alkali}}$$

IV

As used in the above formulas, $n$ indicates the degree of polymerization depending on the molar ratio of reactants. As can be seen from these formulas, the complex epoxide resins used in this invention contain terminal epoxide groups and alcoholic hydroxyl groups attached to the aliphatic portions of the resin, the latter being formed by the splitting of epoxide groups in the reaction of the same with phenolic hydroxyl groups. Ultimately, the reaction with the phenolic hydroxyl groups of the polyhydric phenols is generally accomplished by means of epoxide groups formed from halohydrins by the loss of hydrogen and halogen as shown by the following equation:

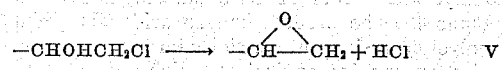
V

Other epoxide compositions which may be used include the polyepoxide polyesters which may be prepared by esterifying tetrahydrophthalic anhydride with glycol and epoxidizing the product of the esterification reaction. In the preparation of the polyesters, tetrahydrophthalic acid may also be used as well as the simple esters of tetrahydrophthalic acid such as dimethyl and diethyl esters. There is a tendency with tertiary glycols for dehydration to occur under the conditions used for esterification so that generally the primary and secondary glycols are the most satisfactory in the polyester formation. Glycols which may be used in the preparation of this polyester composition comprise, in general, those glycols having 2 hydroxyl groups attached to separate carbon atoms and free from functional groups which would interfere with the esterification or epoxidation reactions. Those glycols include such glycols as ethylene glycol, diethylene glycol, triethylene glycol, tetramethylene glycol, propylene glycol, polyethylene glycol, neopentyl glycol, and hexamethylene glycol. Polyepoxide polyesters may be prepared from these polyesters by epoxidizing the unsaturated portions of the tetrahydrophthalic acid residues in the polyester composition. By properly proportioning reactants in the polyester formation and regulating the epoxidation reaction, polyepoxides having up to 12 or more epoxide groups per molecule may be readily prepared. These polyepoxide polyester compositions as well as their preparation are more fully described in a copending application having Serial No. 503,323, filed April 22, 1955.

Polyepoxide compositions useful in this invention also include the epoxidized unsaturated natural oil acid esters, including the unsaturated vegetable, animal, and fish oil acid esters made by reacting these materials with various oxidizing agents. Those unsaturated oil acid esters are long chain aliphatic acid esters containing from about 15 to 22 carbon atoms. These acids may be esterified by simple monohydric alcohols such as methyl, ethyl, or decyl alcohol, by polyhydric alcohols such as glycerol, pentaerythritol, polyallyl alcohol, or resinous polyhydric alcohols. Also suitable are the mixed esters of polycarboxylic acids and long chain unsaturated natural oil acids with polyhydric alcohols, such as glycerol and pentaerythritol. These epoxidized oil acid esters may contain more than 1 up to 20 epoxide groups per molecule. The method of epoxidizing these unsaturated oil acid esters consists of treating them with various oxidizing agents, such as the organic peroxides and the peroxy acids, or with one of the various forms of hydrogen peroxide. A typical procedure practiced in the art consists of using hydrogen peroxide in the presence of an organic acid, such as acetic acid and a catalytic material, such as sulfuric acid. More recently epoxidation methods have consisted of replacing the mineral acid catalyst with a sulfonated cation exchange material, such as the sulfonated copolymer of styrene divinylbenzene.

The epoxide compositions which may be used in preparing the compositions of this invention also include aliphatic polyepoxides which may be illustrated by the products obtained by polymerizing allyl glycidyl ether through its unsaturated portion.

This reaction may be carried out to give the dimer or higher polymers. Other aliphatic polyepoxides useful in this invention may be illustrated by the poly(epoxyalkyl) ethers derived from polyhydric alcohols. These materials may, in general, be prepared by reacting an aliphatic polyhydric alcohol with an epihalohydrin in the presence of a suitable catalyst and in turn dehydrohalogenating the product to produce the epoxide composition. The production of these epoxides may be illustrated by the reaction of glycerol with epichlorohydrin in the presence of boron trifluoride followed by dehydrohalogenation with sodium aluminate as follows:

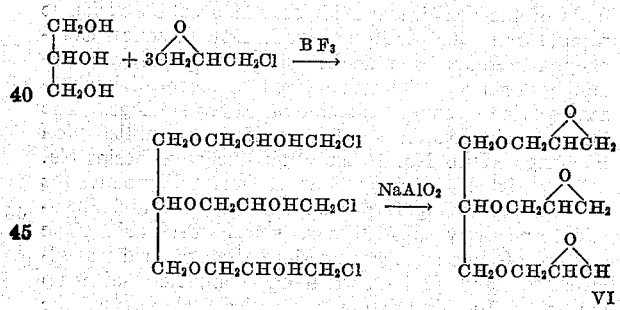

VI

It is to be understood that such reactions do not give pure compounds and that the halohydrins formed and the epoxides derived therefrom are of somewhat varied character depending upon the particular reactants, their proportions, reaction time and temperature. In addition to epoxide groups, the epoxide compositions may be characterized by the presence of hydroxyl groups and halogens. Dehydrohalogenation affects only those hydroxyl groups and halogens which are attached to adjacent carbon atoms. Some halogens may not be removed in this step in the event that the proximate carbinol group has been destroyed by reaction with an epoxide group. These halogens are relatively unreactive and are not to be considered as functional groups in the conversion of the reaction mixtures of this invention. The preparation of a large number of these mixed polyepoxides is described in the Zech patents, U.S. 2,538,072, 2,581,464, and 2,712,000. Still other polyepoxides which have been found to be valuable are such epoxide compositions as diepoxy butane, diglycid ether, and epoxidized polybutadiene.

Immediately following are illustrative examples of the polyepoxides which are used in preparing the compositions of this invention.

The complex resinous polyepoxides used in the examples and illustrative of the commercially prepared products of this type are the Epon resins marketed by Shell Chemical Corporation. The following table gives the properties of some Epon resins which are prepared by the condensation in the presence of alkali of bis(4-hydroxyphenyl)-isopropylidene with a molar excess of epichlorohydrin in varying amounts.

| Epon resin type | Melting point, °C. | Viscosity [1] (Gardner-Holdt) | Epoxide equivalent | Average molecular weight |
| --- | --- | --- | --- | --- |
| Epon 864 | 40–45 | A–B | 325 | 450 |
| Epon 1001 | 64–76 | C–G | 480 | 640 |
| Epon 1004 | 95–105 | Q–U | 870 | 1,133 |
| Epon 1007 | 127–133 | Y–$Z_1$ | 1,750 | |

[1] Based on 40% nonvolatile in butyl Carbitol at 25° C.

Examples 13 through 15 describe the preparation of typical polyepoxide polyesters.

EXAMPLE 13

*Preparation of polyester from tetrahydrophthalic anhydride and ethylene glycol*

In a 3-neck flask provided with a thermometer, mechanical agitator, and a reflux condenser attached through a water trap was placed a mixture of 3 mols of tetrahydrophthalic anhydride and 2 mols of n-butanol, 2 mols of ethylene glycol were added. The reaction mixture was gradually heated with agitation to 225° C. at which point a sufficient amount of xylene was added to give refluxing at esterification temperature. The reaction mixture was then heated with continuous agitation at 225–235° C. until an acid value of 4.2 was obtained. This product gave an iodine value of 128.

*Epoxidation of the polyester resin*

In a 3-neck flask provided with a thermometer, a mechanical agitator, and a reflux condenser was placed 107 parts of the dehydrated acid form of a cation exchange resin (Dowex 50X-8, 50–100 mesh, Dow Chemical Company, a sulfonated styrene-divinylbenzene copolymer containing about 8% divinylbenzene, the percent divinylbenzene serving to control the amount of crosslinkage. The Dowex resins are discussed in publications entitled "Ion Exchange Resins No. 1" and "Ion Exchange Resins No. 2," copyrighted 1954 by Dow Chemical Company, the publications having form number Sp32-254 and Sp31-354, respectively), and 30 parts glacial acetic acid. The mixture of cation exchange resin and acetic acid was allowed to stand until the resin had completely taken up the acid. To this mixture was added 200 parts of the polyester resin dissolved in an equal weight of xylene. To the continuously agitated reaction mixture was added dropwise over a period of 45 minutes to 1 hour 75 parts of 50% hydrogen peroxide. The reaction temperature was held at 60° C. requiring the application of some external heat. (In some preparations involving other polyester resins, sufficient exothermic heat is produced during the addition of hydrogen peroxide so that no external heat is required, or even some external cooling may be required.) The reaction was continued at 60° C. until a milliliter sample of the reaction mixture analyzed less than 1 milliliter of 0.1 N sodium thiosulfate in an iodometric determination of hydrogen peroxide. The product was then filtered, finally pressing the cation exchange resin filter cake. The acid value of the total resin solution was 4.2. The percent nonvolatile of this solution amounting to 400 parts was 50. This 400 parts of solution was thoroughly mixed with 110 parts of the dehydrated basic form of Dowex 1 (an anion exchange resin of the quaternary ammonium type. Dowex 1 is a styrene-divinylbenzene copolymer illustrated by the formula $RR'_3N^+OH^-$ where R represents the styrene-divinylbenzene matrix and R' is a methyl group, manufactured by the Dow Chemical Company). The resulting mixture was then filtered followed by pressing as much of the solution as possible from the anion exchange resin cake. This product had an acid value of 4.5 and an epoxide equivalent of 288 based on a nonvolatile resin content of 42.0%. The epoxide values as discussed herein were determined by refluxing for 30 minutes a 2-gram sample with 50 milliliters of pyridine hydrochloride in excess pyridine. (The pyridine hydrochloride solution was prepared by adding 20 milliliters of concentrated HCl to a liter of pyridine.) After cooling to room temperature, the sample is then back-titrated with standard alcoholic sodium hydroxide.

EXAMPLE 14

Following the procedure of Example 13, a polyester resin was prepared from 5 mols of tetrahydrophthalic anhydride, 4 mols of diethylene glycol, and 2 mols of n-butanol. This product had an acid value of 5.3 and an iodine value of 107. This polyester resin was epoxidized in the manner previously described to give an epoxide equivalent weight of 371 on the nonvolatile content. The nonvolatile content of this resin solution as prepared was 40.2%.

EXAMPLE 15

The process of Example 13 was followed to obtain a polyester resin from 1.1 mols of the tetrahydrophthalic anhydride, 1 mol of 1,4-butanediol and 0.2 mol of n-butanol. The product had an acid value of 8.6. This polyester resin was epoxidized in the same manner to give an epoxide equivalent weight of 292 and an acid value of 5.2 on the nonvolatile content. The nonvolatile content of this resin solution was 41.9%.

Examples 16 and 17 describe the preparation of epoxidized vegetable oil acid esters.

EXAMPLE 16

*Epoxidized soya bean oil acid oil modified alkyd resin* a. *Preparation of alkyd resin.*—To a kettle provided with a condenser was added 290 parts of white refined soya bean oil. While bubbling a continuous stream of nitrogen through this oil, the temperature was raised to 250° C., at which temperature 0.23 part of litharge was added and the temperature held at 250° C. for 5 minutes. While holding the temperature above 218° C., 68 parts of technical pentaerythritol was added after which the temperature was raised to 238° C. and held until a mixture of 1 part of the product and 2½ parts of methyl alcohol showed no insolubility (about 15 minutes). At this point 136 parts of phthalic anhydride was added and the temperature gradually raised to 250° C. and held at this temperature for 30 minutes. At this point the condenser was removed from the kettle and the pressure reduced somewhat by attaching to a water aspirator evacuating system. With continuous agitation the mixture was then held at 250° C. until the acid value had reached 10.5. At this point the resin was thinned with xylene to 48% nonvolatile content having a viscosity of H (Gardner bubble viscosimeter).

b. *Epoxidation of a soya bean oil acid modified alkyd resin.*—In a 3-neck flask provided with a thermometer, a mechanical agitator and a reflux condenser was placed 70 parts of dehydrated acid form of a cation exchange resin (Dowex 50X-8) and 15 parts glacial acetic acid. The mixture of cation exchange resin and acetic acid was allowed to stand until the resin had completely taken up the acid. To this mixture was added 315 parts of the alkyd resin solution described in the above paragraph and 190 parts of xylene. To the continuously agitated reaction mixture was added dropwise 38 parts of 50% hydrogen peroxide. The reaction temperature was held at 60° C. until a milliliter sample of the reaction mixture analyzed less than one milliliter of 0.1 N sodium thiosulfate in an iodometric determination of hydrogen peroxide. The product was then filtered, finally pressing the cation exchange resin filter cake. The epoxide equivalent on the nonvolatile content was 475.

In order to remove the free acidity from the epoxidized product, 400 parts of the solution was thoroughly mixed with 110 parts of the dehydrated basic form of Dowex 1 (an amine type anion exchange resin). The resulting mixture was then filtered, followed by pressing as much of the solution as possible from the anion exchange resin cake.

EXAMPLE 17

Epoxidized soya bean oil

Admex 710, an epoxidized soya bean oil having an equivalent weight to an epoxide of 263, was dissolved in methyl ethyl ketone to a nonvolatile content of 50%. Admex 710, a product of the Archer-Daniels-Midland Company has an acid value of 1, a viscosity of 3.3 stokes at 25° C. and an average molecular weight of 937.

Examples 18 and 19 describe the preparation of simple aliphatic polyepoxides.

EXAMPLE 18

In a reaction vessel provided with a mechanical stirrer and external cooling means was placed 276 parts of glycerol and 828 parts of epichlorohydrin. To this reaction mixture was added 1 part of 45% boron trifluoride ether solution diluted with 9 parts of ether. The reaction mixture was agitated continuously. The temperature rose to 50° C. over a period of 1 hour and 45 minutes at which time external cooling with ice water was applied. The temperature was held between 50 and 75° C. for 1 hour and 20 minutes. To 370 parts of this product in a reaction vessel provided with a mechanical agitator and a reflux condenser was added 900 parts of dioxane and 300 parts of powdered sodium aluminate. With continuous agitation this reaction mixture was gradually heated to 92° C. over a period of 1 hour and 50 minutes, and held at this temperature for 8 hours and 50 minutes. After cooling to room temperature the inorganic material was removed by filtration. The dioxane and low boiling products were removed by heating the filtrate to 205° C. at 20 mm. pressure to give 260 parts of a pale yellow product. The epoxide equivalent of this product was determined by treating a 1-gram sample with an excess of pyridine containing pyridine hydrochloride (made by adding 20 cc. of concentrated hydrochloric acid per liter of pyridine) at the boiling point for 20 minutes and back-titrating the excess pyridine hydrochloride with 0.1 N sodium hydroxide using phenolphthalein as indicator and considering one HCl as equivalent to one epoxide group. The epoxide equivalent on this product was found to be 152.

EXAMPLE 19

In a 3-neck flask provided with a thermometer, a mechanical agitator, a reflux condenser and a dropping funnel was placed 402 parts of allyl glycidyl ether. With continuous agitation the temperature was raised to 160° C. at which time one part of a solution of methyl ethyl ketone peroxide dissolved in diethyl phthalate to a 60% content was added. The temperature was held at 160–165° C. for a period of 8 hours, adding one part of the methyl ethyl ketone peroxide solution each 5 minutes during this 8-hour period. After the reaction mixture had stood overnight, the volatile ingredients were removed by vacuum distillation. The distillation was started at 19 mm. pressure and a pot temperature of 26° C. and volatile material finally removed at a pressure of 3 mm. and a pot temperature of 50° C. The residual product had a molecular weight of 418, and equivalent weight to epoxide content of 198, with the yield amounting to 250 parts.

Two general classes of aldehyde condensates are contemplated for preparing the modified products of this invention, those prepared from ammonia derivatives and those derived from phenols, with the choice being dependent on the end uses and characteristics desired. For instance, if the end use were to be a white enamel, the ammonia derivative-aldehyde condensates would probably be chosen because of their extremely light initial color and their good color retention, the phenols are somewhat darker in color and have a tendency to yellow upon aging. For the most desirable non-polar solvent solubility, the phenol-aldehyde condensates would be the proper choice since the ammonia derivative-aldehyde condensates usually require some butanol and xylol present to give the desirable solubility. For certain applications, the butanol odor is objectionable and at times incompatible with the resin with which it is used. Adhesion to metals also appears to be better in the phenol-aldehyde condensates. Finally, the phenol-aldehyde condensates are advantageous, from an economic standpoint.

The aldehyde-ammonia derivative condensation products are formed by the reaction of aldehydes with amides such as urea, thiourea, and their derivatives, melamines and sulfonamides. It is well known that various amines and amides will react with formaldehyde to form aldehyde-amine or aldehyde-amide condensates. A number of derivatives of the amines and amides mentioned are also contemplated herein. Exemplary derivatives are substituted urea, thiourea, or melamine such as the long-chain alkyl-substituted materials which impart oil or organic solvent solubility. Suitable sulfonamides include aromatic mononuclear sulfonamides such as toluene sulfonamide, polynuclear sulfonamides such as naphthalene sulfonamide, sulfonamides of aromatic polynuclear ethers and mono or polyfunctional sulfonamides. In addition to melamine, other operable ammonia derivatives containing the azide bridge are the amino di- and triazines.

In the condensation of aldehydes with the organic ammonia derivatives, initially the reaction appears to be the addition of aldehyde to the organic ammonia derivative to form primarily intermediate alkylol compounds. These compounds will further condense to form more resinous materials, combining with each other through alkylene bridges formed between the nitrogen atoms of the compounds.

In the alkylol condensate and in the more condensed products of an advanced stage of condensation, there are hydrogen atoms present in the hydroxyl groups which have been formed in the production of the alkylol condensate and which have not been destroyed by further condensation. There are also an appreciable number of hydrogen atoms attached to nitrogen atoms of the amide or amine groups present in the condensation products. These hydrogens contained in the hydroxyl groups and the amide or amine groups are active with respect to epoxide groups and will react therewith in the reaction mixtures of this invention to form complex, crosslinked products.

In general, the condensation products of ammonia derivatives and aldehydes contemplated herein are partial and intermediate reaction or condensation products of aldehydes, particularly formaldehyde, with amines or amides, or mixtures thereof. The reactions which produce such condensation products involve the removal of amino or amido hydrogen atoms from the ammonia derivative. Therefore, it should be understood that an ammonia derivative, in order to be suitable for condensation with an aldehyde must contain at least one hydrogen atom attached to the nitrogen atom. Fusible materials of varying degrees of condensation may be used with the epoxides and the co-amides to form the new compositions and reaction products of this invention. Thus, the condensates may be made by various processes known in the art for the manufacture of aldehyde-ammonia derivative resins, resulting in water-soluble, alcohol-soluble or oil-soluble types.

For use herein, the aldehyde-ammonia derivative condensate may be in its monomeric form which is essentially an alkylol or polyalkylol product or it may be highly condensed. It is suitable as long as it is still fusible and is soluble in or compatible with the epoxide composition and the co-amide composition with which it is to be reacted.

Many of the commercial products derived from the reaction of urea, thiourea, or melamine with formaldehyde are mixed products made by reacting the formaldehyde with mixtures of these materials. Such composite or mixed reaction products can advantageously be used for reaction with the epoxides and the co-amides according to the present invention. In addition, many of the present day commercial resins derived from aldehydes and urea, thiourea, or melamine, or a mixture thereof, are prepared in the presence of alcoholic or other solvents which take part in the reaction and become an integral part of the resulting resin composition. This is illustrated by the products prepared in the presence of butyl alcohol in which case the butyl alcohol to some extent condenses with the alkylol groups of the aldehyde condensate to give butyl ether residues as a part of the final composition. Such modified products are also suitable. In some cases it may be desirable to use an ammonia derivative-aldehyde condensate which is completely soluble in a common solvent or a mixture of solvents used to dissolve the epoxide and the co-amide. Solutions prepared in this manner can be applied as a coating and the solvent subsequently evaporated before the main reaction between the epoxide, co-amide, and condensate takes place.

Examples 20 to 24, inclusive, describe the preparation of typical ammonia derivative aldehyde condensates suitable for use herein.

EXAMPLE 20

In a 3-liter 3-neck flask provided with a mechanical agitator, a thermometer, and reflux condenser was placed 120 parts of urea, 600 parts of 37% aqueous formaldehyde, and 1040 parts of n-butyl alcohol. With continuous agitation the reaction mixture was heated to reflux temperature and the refluxing continued for a period of 1 hour. At this point a water trap was placed between the reflux condenser and flask and filled with toluene. Distillation was continued until 315 parts of water were removed from the reaction mixture. The resulting mixture was cooled to room temperature, filtered, and 1030 parts of a clear, water-white, syrupy liquid isolated.

EXAMPLE 21

The procedure of preparation including the water removal was the same as that used in Example 20. A mixture of 304 parts of thiourea, 960 parts of 37% aqueous formaldehyde, and 800 parts of n-butyl alcohol was used to give a final yield of 1214 parts of a clear, light amber, syrupy product.

EXAMPLE 22

The procedure of preparation including the removal of water was the same as that used in Example 20. A mixture of 120 parts of urea, 148 parts of thiourea, 950 parts of 37% aqueous formaldehyde, and 800 parts of n-butyl alcohol was used to give a final yield of 1175 parts of a clear, almost colorless, syrupy liquid.

EXAMPLE 23

In a 3-liter 3-neck flask provided with a mechanical agitator, a thermometer, and a reflux condenser was placed 378 parts of melamine, 840 parts of 37% aqueous formaldehyde, and 725 parts of n-butyl alcohol. With continuous agitation the reaction mixture was heated to reflux temperature and the refluxing continued for a period of 30 minutes. At this point a water trap was placed in the distilling column between the flask and the reflux condenser and filled with toluene. The refluxing was continued until a total of 590 parts of water had been removed from the reaction mixture. The product amounting to 1342 parts was a clear, water-white, heavy, syrupy liquid.

EXAMPLE 24

In a 3-liter 3-neck flask provided with a mechanical agitator, a thermometer, and a reflux condenser was placed 1370 parts of p-toluenesulfonamide and 640 parts of 37% aqueous formaldehyde the pH of which had been previously adjusted to 6.0 with potassium acid phthalate and sodium hydroxide. With continuous agitation the reaction mixture was heated to reflux temperature over a period of 40 minutes and the refluxing continued for a period of 15 minutes. At this point the reaction mixture was allowed to cool and the water decanted from the resin. The resin was washed 3 times with warm water and finally dehydrated in vacuum at 30–50 mm. pressure, using a maximum flask temperature of 90° C. to yield 1245 parts of water-white resinous solid.

The second class of condensates suitable for modifying the compositions herein described are those which contain reactive phenolic hydroxyl groups formed by the reaction of phenols and aldehydes. Phenol and formaldehyde react to form a variety of reaction products depending upon the proportions and conditions of reaction. These include products such as phenol alcohols having both phenolic and alcoholic hydroxyl groups, and products of the diphenolmethane type containing phenolic hydroxyl groups only. The condensation of phenol and formaldehyde can be carried out with the use of acid or alkaline condensing agents and in some cases by first combining the aldehyde with an alkali such as ammonia to form hexamethylenetetramine and reacting the latter with the phenol. The phenol-aldehyde resins at an initial or intermediate stage of reaction are intended to be included in the term phenol-aldehyde condensates as used herein.

In general, the phenol-aldehyde condensates should not have their condensation carried so far as to become insoluble and nonreactive. It is preferred in the preparation of the instant compositions that they be used at an intermediate stage or at a stage of reaction such that they contain reactive phenolic hydroxyl groups or both phenolic and alcoholic hydroxyl groups. This is desirable in order to permit a proper blending of the phenol-aldehyde condensate with the polyepoxides and co-amides for subsequent reaction therewith.

The phenol-aldehyde condensates may be derived from mononuclear phenols, polynuclear phenols, monohydric phenols, or polyhydric phenols. The critical requirement for the condensate is that it be compatible with the polyepoxides and co-amides or with the two reactants in a solvent used as a reaction medium. The phenol-aldehyde condensate which is essentially a polymethylol phenol rather than a polymer may be used in the preparation of the new phenol-aldehyde, polyepoxide, co-amide products, or it may be used after further condensation, in which case some of the methylol groups are usually considered to have disappeared in the process of condensation. Various so-called phenolic resins which result from the reaction of phenols and aldehydes, and particularly from common phenols or cresols and formaldehyde, are available as commercial products both of an initial and intermediate character. Such products include resins which are readily soluble in common solvents or readily fusible so that they can be admixed with the epoxides and co-amides and reacted therewith to form the products of this invention.

In selecting a phenol-aldehyde condensate one may choose either the heat-converting or the permanently fusible type. For example, the formaldehyde reaction products of such phenols as carbolic acid, resorcinol, and bis-(4-hydroxyphenyl)isopropylidene readily convert to infusible, insoluble compositions on the application of heat. On the other hand, some of the paraalkylated phenols, as illustrated by p-tert-butylphenol, produce permanently fusible resins on reaction with formaldehyde. Even though fusible condensates are employed, however, insoluble, infusible products result when they are heated in combination with the epoxides and the co-amides described.

Examples 25 to 27, inclusive, describe the preparation of some of the operable phenol-aldehyde condensates which may be used in combination with the polyepoxides and the co-amide to form the products herein described.

EXAMPLE 25

*Condensation of Bisphenol [2,2-bis(4-hydroxyphenyl)-propane] with formaldehyde*

In a 3-liter 3-neck flask provided with a mechanical agitator, a thermometer, and a reflux condenser was placed 912 parts of Bisphenol A, 960 parts of 37% aqueous formaldehyde, and 2.3 parts of oxalic acid. With continuous agitation, the reaction mixture was heated to the reflux temperature and refluxing continued for a period of 1 hour. After permitting the reaction mixture to cool to around 50° C. the water layer was removed by decantation. The phenol-formaldehyde layer was then washed three times with water which in each case was removed by decantation. The last portion of water was removed by distillation at reduced pressure using a water aspirator system which gave pressure around 30-40 mm. The temperature during the removal of this last portion of water ranged from 70-90° C. The product, amounting to 1065 parts, was a clear, heavy, syrupy material.

EXAMPLE 26

*Reaction of p-tertiary butylphenol with formaldehyde*

The procedure of preparation, including the dehydration step, was the same as that used in Example 25. A mixture of 1000 parts of p-tert-butylphenol, 1067 parts of 37% aqueous formaldehyde, and 10 parts of sodium hydroxide was used to give a final yield of 1470 parts of a clear, almost colorless syrupy product.

EXAMPLE 27

*Reaction of phenol with formaldehyde*

Again a reaction procedure including the dehydration step was the same as that used in Example 25. A mixture of 658 parts of phenol, 1400 parts of 37% aqueous formaldehyde, and 6.6 parts of sodium hydroxide was used to give a final yield of 1168 parts of a clear, syrupy product.

The subject polymeric final reaction products are generally obtained by heating mixtures comprised of polyepoxides and co-amides or said mixtures plus aldehyde condensates, with or without a catalyst. The reaction mixtures convert readily under moderate conditions to yield the final reaction product, preferred temperatures being in the range of about 100-200° C. When a catalyst is present, shorter heating periods or lower temperatures can usually be employed to bring about conversion. Operable catalysts are the Friedel-Crafts type, such as boron trifluoride adducts, mineral acids such as sulfuric acid, and alkaline salts such as the sodium salts of phenols or alcohols.

The reactions which take place during the conversion of the reaction mixtures appear complex and it is not desired to be limited by any theoretical explanations of the exact nature involved. However, it seems likely that the reaction includes polymerization of the epoxide compositions inter se; ammonia derivative-aldehyde condensation or phenol-aldehyde condensation, reaction of epoxide groups with active hydrogen-containing groups such as methylol groups, phenolic hydroxyl groups, and amino or amide groups, all of which take place to some extent simultaneously in forming the polymer.

In preparing the new composition for a particular use the polyepoxides and co-amides or such compositions modified with aldehyde condensates may be used in regulated proportions without the addition of other materials. However, other constituents, such as filling and compounding materials, plasticizers, pigments, etc., in some instances, can be advantageously admixed with the new compositions. The method of blending depends upon the materials used and their softening points or the solubility of the materials in a common solvent. For most uses, it is possible to regulate the proportions and types of reacting ingredients so as to obtain a product having characteristics required for the particular use. It is considered an important feature of this invention that the subject compositions are so versatile as to obviate the necessity of employing conventional modifying additives.

The reaction mixtures and the final insoluble, infusible reaction products may be prepared by using varying proportions of co-amides, polyepoxide, and aldehyde condensate. For instance, if relatively flexible final conversion products are desired, they may be advantageously prepared by using an excess of a relatively soft epoxide resin with lesser amounts of a relatively hard aldehyde condensate or by employing an excess of a relatively soft aldehyde condensate with lesser amounts of the harder epoxide resin. Conversely, a harder conversion product could be prepared by using an excess of a relatively hard epoxide resin with lesser amounts of the softer aldehyde condensate or by using an excess of relatively hard aldehyde condensate with lesser amounts of the softer epoxide resins. Similarly, the amounts of co-amide used may be adjusted to produce variations in hardness of the final conversion products.

It is thus apparent that a wide range of proportions of reactants are operable in the herein described compositions depending largely on the characteristics desired for the final product. The ratios of polyepoxide to co-amide can be as high as 6:1 and 1:6 for certain compositions, but it is usually preferred in order to obtain the most desirable overall characteristics to have this ratio at a near equivalent basis. Therefore, ratios of 2:1 to 1:2 constitute the preferred range. Equivalents as expressed herein refer to the weight of the epoxide per epoxide group in the case of the polyepoxides and the weight of the co-amide per active hydrogen in the case of the co-amide. The aldehyde condensates can be employed to make up from 0-70% of the composition by weight, but it is usually sufficient, where the condensate is used, to use about 10% of the aldehyde condensate on a weight basis, the aldehyde condensate imparting in most instances increased hardness, increased water and alkali resistance, acceleration of the conversion and in some cases increased flexibility.

The conversion of the reaction mixtures of the polymeric products may be carried out with or without the use of solvents, depending upon the final results desired. In the preparation of protective coatings, for example, it is usually better to apply products dissolved in a solvent, in which case the composition will give an initial air dry by solvent evaporation and at a subsequent time the dried film can be converted to an insoluble, infusible product by the application of heat. In the preparation of molding and adhesive compositions, it is usually desirable to use an essentially solvent-free system, with the conversion taking place directly upon the application of heat.

It may also be desirable to partially react a mixture of the co-amide and the polyepoxide or said compositions modified with aldehyde condensates, terminating the reaction at an intermediate stage wherein the products are still soluble and fusible. This intermediate product can then be further reacted by the application of heat to form an insoluble, infusible reaction product. Such intermediate products may be useful in the preparation of protective coatings or impregnating compositions since they may be dissolved in a solvent, applied, and allowed to dry to a tack-free film which is still fusible and then converted by the application of heat to an infusible stage.

In addition to having outstanding physical properties, such as hardness, toughness, and flexibility, the subject final infusible, insoluble products generally display outstanding chemical properties, including high resistance to oxidation, alkali, and solvents. Excellent film-forming characteristics may be obtained by proper selection of the co-amide and the polyepoxide or such compositions modified with aldehyde condensates. In addition, mixtures may be prepared wherein the reacting ingredients generally display good compatibility for each other, as demonstrated by the clarity of the films prepared from the reaction mixtures. The compatibility and plasticity characteristics of these compositions can be readily adjusted by the choice of polyamine or modifying organic acid used in preparing the co-amides.

A further noteworthy characteristic observed in the final conversion products is their good adhesion to ordinary surfaces, including metals, glass, wood, and plastics. The adhesive properties of the products contribute substantially to their usefulness in the preparation of adhesives and coatings. The adhesive characteristics may properly be explained by the fact that the compositions contain a high percentage of polar groups such as ether, ester, amino or amide, and alcoholic and phenolic hydroxyl groups.

Examples 28 to 392, inclusive, illustrate the preparation of insoluble, infusible protective coating films prepared from the subject co-amides and polyepoxides or said compositions modified with aldehyde condensates. In the preparation of the compositions, the co-amides were dissolved in methyl ethyl ketone to a nonvolatile content of 50%. The phenol-aldehyde condensates were similarly dissolved in a mixture of methyl ethyl ketone and butanol to a nonvolatile content of 40–60%. The polyepoxides were dissolved to a nonvolatile content of 40–60% in methyl ethyl ketone with the exception of the epoxidized polyesters, in which instances the solvent was xylene. Mixtures of the solutions were spread on glass panels with a .002″ Bird applicator and the films baked for periods of ½ to 2½ hours at 150–200° C. Proportions as expressed in the following tables refer to parts by weight and are based on the nonvolatile content of the solutions of reactants.

| Ex. No. | Parts of polyepoxide | Parts of polyhydric phenol | Parts of aldehyde condensate | Baking schedule, min./°C. | Film resistance | |
|---|---|---|---|---|---|---|
| | | | | | Boiling water | 5% aqueous NaOH at 25° C. |
| 28 | 10.0 Epon 864 | 8.7 Ex. 1 | | 30/175 | | 168 hr. |
| 29 | do | 8.7 Ex. 2 | | 30/175 | | 168 hr. |
| 30 | do | 6.8 Ex. 3 | | 30/175 | | 6 hr. |
| 31 | do | 3.9 Ex. 4 | | 30/175 | | 23 hr. |
| 32 | do | 6.4 Ex. 5 | | 30/175 | | 5 hr. |
| 33 | do | 8.9 Ex. 6 | | 30/175 | | 192 hr. |
| 34 | 10.0 Epon 865 | 4.5 Ex. 7 | | 30/175 | | 192 hr. |
| 35 | 10.0 Epon 864 | 10.1 Ex. 8 | | 30/175 | | 168 hr. |
| 36 | do | 10.1 Ex. 9 | | 30/175 | | 125 hr. |
| 37 | 10.0 Epon 1001 | 6.1 Ex. 1 | | 30/175 | | 168 hr. |
| 38 | do | 6.1 Ex. 2 | | 30/175 | | 168 hr. |
| 39 | do | 4.7 Ex. 3 | | 30/175 | | 23 hr. |
| 40 | do | 4.4 Ex. 5 | | 30/175 | | 3 hr. |
| 41 | do | 6.2 Ex. 6 | | 30/175 | | 192 hr. |
| 42 | do | 6.9 Ex. 8 | | 30/175 | | 192 hr. |
| 43 | 10.0 Epon 1004 | 3.3 Ex. 1 | | 30/175 | | 168 hr. |
| 44 | do | 3.3 Ex. 2 | | 30/175 | | 124 hr. |
| 45 | do | 2.6 Ex. 3 | | 30/175 | | 23 hr. |
| 46 | do | 2.2 Ex. 5 | | 30/175 | | 23 hr. |
| 47 | do | 3.8 Ex. 8 | | 30/175 | | 192 hr. |
| 48 | do | 3.8 Ex. 9 | | 30/175 | | 123 hr. |
| 49 | 10.0 Epon 1007 | 1.7 Ex. 1 | | 30/175 | | 23 hr. |
| 50 | do | 1.7 Ex. 2 | | 30/175 | | 30 hr. |
| 51 | do | 1.3 Ex. 3 | | 30/175 | | 192 hr. |
| 52 | do | 1.2 Ex. 5 | | 30/175 | | 23 hr. |
| 53 | do | 1.9 Ex. 8 | | 30/175 | | 23 hr. |
| 54 | do | 1.9 Ex. 9 | | 30/175 | | 1¼ hr. |
| 55 | 1.0 Epon 1007 | 9.0 Ex. 4 | | 30/175 | 8 hr. | ½ hr. |
| 56 | 50.0 Epon 864 | 18.8 Ex. 10 | | 30/200 | | 162 hr. |
| 57 | do | 5.0 Ex. 11 | | 90/200 | | 162 hr. |
| 58 | do | 4.4 Ex. 12 | | 60/200 | | 162 hr. |
| 59 | 100.0 Epon 1001 | 22.6 Ex. 10 | | 30/200 | | 162 hr. |
| 60 | do | 60.2 Ex. 22 | | 60/200 | | 46 hr. |
| 61 | do | 53.0 Ex. 12 | | 30/175 | | 200 hr. |
| 62 | 100.0 Epon 1004 | 13.8 Ex. 10 | | 60/200 | | 162 hr. |
| 63 | do | 36.8 Ex. 11 | | 150/200 | | 162 hr. |
| 64 | do | 32.2 Ex. 12 | | 30/200 | | 162 hr. |
| 65 | 100.0 Epon 1007 | 6.4 Ex. 10 | | 30/175 | | 200 hr. |
| 66 | do | 17.0 Ex. 11 | | 150/200 | | 162 hr. |
| 67 | do | 15.0 Ex. 12 | | 150/200 | | 162 hr. |
| 68 | 10.0 Ex. 13 | 8.6 Ex. 1 | | 30/150 | 2¼ hr. | 45 hr. |
| 69 | 10.0 Ex. 13 | 8.4 Ex. 3 | | 30/150 | 2 hr. | 45 hr. |
| 70 | 10.0 Ex. 13 | 8.4 Ex. 7 | | 30/150 | 12 hr. | 45 hr. |
| 71 | 10.0 Ex. 13 | 7.4 Ex. 8 | | 30/150 | 3 hr. | 24 hr. |
| 72 | 10.0 Ex. 15 | 11.3 Ex. 1 | | 30/150 | 12 hr. | 45 hr. |
| 73 | 10.0 Ex. 15 | 11.0 Ex. 6 | | 30/150 | 11½ hr. | 45 hr. |
| 74 | 10.0 Ex. 15 | 11.0 Ex. 7 | | 30/150 | 8½ hr. | 5 min. |
| 75 | 10.0 Ex. 15 | 9.7 Ex. 8 | | 30/150 | 25 min. | 24 hr. |
| 76 | 10.0 Ex. 15 | 9.7 Ex. 9 | | 30/150 | 15 min. | 6½ hr. |
| 77 | 10.0 Ex. 15 | 6.3 Ex. 4 | | 30/150 | 3 hr. | 2½ hr. |
| 78 | 10.0 Ex. 14 | 9.9 Ex. 1 | | 30/150 | 4½ hr. | 10 min. |
| 79 | 10.0 Ex. 14 | 9.9 Ex. 2 | | 30/150 | 6 hr. | 5 min. |
| 80 | 10.0 Ex. 14 | 6.4 Ex. 3 | | 30/150 | 12 hr. | 3 hr. |
| 81 | 10.0 Ex. 14 | 13.5 Ex. 5 | | 30/150 | 6 hr. | 1 hr. |
| 82 | 10.0 Ex. 14 | 9.7 Ex. 6 | | 30/150 | 6½ hr. | 12 hr. |
| 83 | 10.0 Ex. 14 | 9.7 Ex. 7 | | 30/150 | 6½ hr. | 1½ hr. |
| 84 | 10.0 Ex. 14 | 8.6 Ex. 9 | | 30/150 | 3 hr. | 1 hr. |
| 85 | 1.0 Ex. 14 | 9.0 Ex. 6 | | 30/175 | 8 hr. | 30 min. |
| 86 | 9.0 Ex. 15 | 1.0 Ex. 1 | | 30/175 | 7 hr. | 52 hr. |
| 87 | 10.0 Ex. 16 | 3.5 Ex. 1 | | 30/175 | 20 min. | 2 hr. |
| 88 | 10.0 Ex. 16 | 3.5 Ex. 2 | | 30/175 | 10 min. | 20 min. |
| 89 | 10.0 Ex. 16 | 2.8 Ex. 3 | | 30/175 | 20 min. | 30 min. |
| 90 | 10.0 Ex. 16 | 3.1 Ex. 4 | | 30/175 | 20 min. | 20 min. |
| 91 | 10.0 Ex. 16 | 3.6 Ex. 6 | | 30/175 | 12 hr. | 2 hr. |
| 92 | 10.0 Ex. 16 | 3.6 Ex. 7 | | 30/175 | 2 hr. | 30 min. |
| 93 | 10.0 Ex. 16 | 4.1 Ex. 8 | | 30/175 | 20 min. | 20 min. |
| 94 | 10.0 Ex. 16 | 4.1 Ex. 9 | | 30/175 | 20 min. | 2¾ hr. |
| 95 | 10.0 Ex. 17 | 22.4 Ex. 2 | | 30/200 | 30 min. | 15 min. |
| 96 | 10.0 Ex. 17 | 23.0 Ex. 6 | | 30/200 | 12 hr. | 4½ hr. |
| 97 | 10.0 Ex. 17 | 23.0 Ex. 7 | | 30/200 | 12 hr. | 1⅔ hr. |

| Ex. No. | Parts of polyepoxide | Parts of polyhydric phenol | Parts of aldehyde condensate | Baking schedule, min./°C. | Film resistance Boiling water | Film resistance 5% aqueous NaOH at 25° C. |
|---|---|---|---|---|---|---|
| 98 | 10.0 Ex. 17 | 25.8 Ex. 8 | | 30/200 | 40 min | 10 min. |
| 99 | 1.5 Ex. 16 | 8.5 Ex. 9 | | 30/175 | 30 min | 30 min. |
| 100 | 9.0 Ex. 16 | 1.0 Ex. 2 | | 30/175 | 8 hr | 68 hr. |
| 101 | 10.0 Ex. 18 | 19.5 Ex. 1 | | 30/175 | 30 min | 40 min. |
| 102 | 10.0 Ex. 18 | 19.5 Ex. 2 | | 30/175 | 12 hr | 22 hr. |
| 103 | 10.0 Ex. 18 | 15.2 Ex. 3 | | 30/175 | 10 hr | 2 hr. |
| 104 | 10.0 Ex. 18 | 17.4 Ex. 4 | | 30/175 | 12 hr | 1 hr. |
| 105 | 10.0 Ex. 18 | 17.4 Ex. 5 | | 30/175 | 12 hr | 1 hr. |
| 106 | 10.0 Ex. 18 | 20.0 Ex. 6 | | 30/175 | 12 hr | 5 hr. |
| 107 | 10.0 Ex. 18 | 22.6 Ex. 8 | | 30/175 | 12 hr | 168 hr. |
| 108 | 10.0 Ex. 18 | 22.6 Ex. 9 | | 30/175 | 12 hr | 168 hr. |
| 109 | 10.0 Ex. 19 | 14.4 Ex. 1 | | 30/175 | 4 hr | 18 hr. |
| 110 | 10.0 Ex. 19 | 11.3 Ex. 3 | | 30/175 | 1½ hr | 18 hr. |
| 111 | 10.0 Ex. 19 | 12.9 Ex. 4 | | 30/175 | 5½ hr | 29½ hr. |
| 112 | 10.0 Ex. 19 | 10.7 Ex. 5 | | 30/175 | 1½ hr | 18 hr. |
| 113 | 10.0 Ex. 19 | 14.9 Ex. 6 | | 30/175 | 1½ hr | 28 hr. |
| 114 | 10.0 Ex. 19 | 14.9 Ex. 7 | | 30/175 | 5 hr | 18 hr. |
| 115 | 10.0 Ex. 19 | 16.9 Ex. 8 | | 30/175 | 4 hr | 19 hr. |
| 116 | 10.0 Ex. 19 | 16.9 Ex. 9 | | 30/175 | 5½ hr | 24 hr. |
| 117 | 1.5 Ex. 18 | 8.5 Ex. 4 | | 30/175 | 8 hr | 30 min. |
| 118 | 8.5 Ex. 18 | 1.5 Ex. 2 | | 30/175 | 8 hr | 30 min. |
| 119 | 10.0 Epon 864 | 8.7 Ex. 1 | 1.8 Ex. 26 | 30/175 | 2 hr | 168 hr. |
| 120 | do | 8.7 Ex. 1 | 1.8 Ex. 27 | 30/175 | 2 hr | 168 hr. |
| 121 | do | 8.7 Ex. 2 | 1.8 Ex. 27 | 30/175 | 6 hr | 168 hr. |
| 122 | do | 8.7 Ex. 2 | 3.6 Ex. 25 | 30/175 | 5 min | 192 hr. |
| 123 | do | 8.7 Ex. 2 | 3.6 Ex. 26 | 30/175 | 5 min | 168 hr. |
| 124 | do | 6.8 Ex. 3 | 3.2 Ex. 27 | 30/175 | 10 min | 45 hr. |
| 125 | do | 6.8 Ex. 3 | 3.2 Ex. 25 | 30/175 | 20 min | 30 hr. |
| 126 | do | 6.8 Ex. 3 | 1.6 Ex. 26 | 30/175 | 3 hr | 30 hr. |
| 127 | do | 6.9 Ex. 6 | 1.8 Ex. 26 | 30/175 | 2 hr | 168 hr. |
| 128 | do | 8.9 Ex. 6 | 3.2 Ex. 25 | 30/175 | 12 hr | 168 hr. |
| 129 | do | 8.9 Ex. 7 | 1.9 Ex. 27 | 30/175 | 1 hr | 168 hr. |
| 130 | do | 10.1 Ex. 8 | 4.0 Ex. 25 | 30/175 | 15 min | 168 hr. |
| 131 | do | 6.1 Ex. 1 | 3.2 Ex. 26 | 30/175 | 20 min | 168 hr. |
| 132 | do | 6.1 Ex. 1 | 1.6 Ex. 26 | 30/175 | 5 min | 168 hr. |
| 133 | do | 6.1 Ex. 1 | 3.2 Ex. 25 | 30/175 | 5 min | 122 hr. |
| 134 | 10.0 Epon 1001 | 6.1 Ex. 2 | 1.6 Ex. 25 | 30/175 | 5 min | 168 hr. |
| 135 | do | 6.1 Ex. 2 | 1.6 Ex. 26 | 30/175 | 5 min | 168 hr. |
| 136 | do | 4.7 Ex. 3 | 2.9 Ex. 27 | 30/175 | 30 min | 34 hr. |
| 137 | do | 4.7 Ex. 3 | 2.9 Ex. 26 | 30/175 | 10 min | 75 hr. |
| 138 | do | 4.7 Ex. 3 | 1.5 Ex. 25 | 30/175 | 10 min | 30 hr. |
| 139 | do | 5.4 Ex. 4 | 1.5 Ex. 26 | 30/175 | 5 min | 168 hr. |
| 140 | do | 5.4 Ex. 4 | 3.0 Ex. 26 | 30/175 | 35 min | 168 hr. |
| 141 | do | 6.2 Ex. 6 | 3.0 Ex. 26 | 30/175 | 6½ hr | 168 hr. |
| 142 | do | 6.2 Ex. 7 | 1.6 Ex. 26 | 30/175 | 40 min | 168 hr. |
| 143 | do | 6.9 Ex. 8 | 3.4 Ex. 27 | 30/175 | 3 hr | 168 hr. |
| 144 | do | 6.9 Ex. 8 | 3.4 Ex. 26 | 30/175 | 1½ hr | 168 hr. |
| 145 | 10.0 Epon 1004 | 3.3 Ex. 1 | 2.6 Ex. 26 | 30/175 | 30 min | 192 hr. |
| 146 | do | 3.3 Ex. 2 | 2.6 Ex. 26 | 30/175 | 5 min | 48 hr. |
| 147 | do | 2.6 Ex. 3 | 2.6 Ex. 27 | 30/175 | 5 min | 30 hr. |
| 148 | do | 2.6 Ex. 3 | 2.6 Ex. 25 | 30/175 | 5 min | 30 hr. |
| 149 | do | 2.6 Ex. 3 | 2.6 Ex. 26 | 30/175 | 5 min | 168 hr. |
| 150 | do | 2.9 Ex. 4 | 2.6 Ex. 27 | 30/175 | 35 min | 144 hr. |
| 151 | do | 2.9 Ex. 4 | 2.6 Ex. 26 | 30/175 | 35 min | 168 hr. |
| 152 | do | 2.2 Ex. 5 | 2.4 Ex. 25 | 30/175 | 2 hr | 168 hr. |
| 153 | do | 3.4 Ex. 6 | 1.3 Ex. 26 | 30/175 | 40 min | 168 hr. |
| 154 | do | 3.4 Ex. 6 | 2.7 Ex. 25 | 30/175 | 18 hr | 168 hr. |
| 155 | do | 3.4 Ex. 7 | 1.3 Ex. 27 | 30/175 | 1 hr | 168 hr. |
| 156 | do | 3.8 Ex. 8 | 2.7 Ex. 25 | 30/175 | 15 min | 168 hr. |
| 157 | do | 3.8 Ex. 8 | 2.7 Ex. 26 | 30/175 | 30 min | 168 hr. |
| 158 | do | 3.8 Ex. 9 | 2.9 Ex. 27 | 30/175 | 1 hr | 168 hr. |
| 159 | do | 3.8 Ex. 9 | 2.9 Ex. 26 | 30/175 | 1 hr | 168 hr. |
| 160 | 10.0 Epon 1007 | 1.7 Ex. 1 | 2.3 Ex. 27 | 30/175 | 5 min | 96 hr. |
| 161 | do | 1.7 Ex. 1 | 1.2 Ex. 25 | 30/175 | 5 min | 168 hr. |
| 162 | do | 1.7 Ex. 1 | 1.2 Ex. 26 | 30/175 | 5 min | 192 hr. |
| 163 | do | 1.7 Ex. 2 | 2.5 Ex. 27 | 30/175 | 5 min | 58 hr. |
| 164 | do | 1.7 Ex. 2 | 1.3 Ex. 25 | 30/175 | 5 min | 34 hr. |
| 165 | do | 1.7 Ex. 2 | 1.3 Ex. 26 | 30/175 | 5 min | 168 hr. |
| 166 | do | 1.3 Ex. 3 | 2.3 Ex. 27 | 30/175 | 5 min | 96 hr. |
| 167 | do | 1.3 Ex. 3 | 2.3 Ex. 25 | 30/175 | 5 min | 168 hr. |
| 168 | do | 1.3 Ex. 3 | 2.3 Ex. 26 | 30/175 | 5 min | 168 hr. |
| 169 | do | 1.5 Ex. 4 | 2.3 Ex. 27 | 30/175 | 35 min | 75 hr. |
| 170 | do | 1.5 Ex. 4 | 2.3 Ex. 26 | 30/175 | 35 min | 168 hr. |
| 171 | do | 1.7 Ex. 6 | 2.4 Ex. 27 | 30/175 | 35 min | 168 hr. |
| 172 | do | 1.7 Ex. 7 | 1.2 Ex. 26 | 30/175 | 35 min | 168 hr. |
| 173 | do | 1.9 Ex. 8 | 2.4 Ex. 26 | 30/175 | 5 hr | 168 hr. |
| 174 | do | 1.9 Ex. 9 | 2.3 Ex. 25 | 30/175 | 35 min | 168 hr. |
| 175 | 1.0 Epon 864 | 8.0 Ex. 2 | 1.0 Ex. 27 | 30/175 | 8 hr | 30 min. |
| 176 | 2.5 Epon 864 | 2.5 Ex. 2 | 5.0 Ex. 25 | 30/175 | 8 hr | 20 hr. |
| 177 | 1.0 Epon 864 | 1.0 Ex. 2 | 8.0 Ex. 25 | 30/175 | 30 min | 30 min. |
| 178 | 10.0 Ex. 13 | 8.6 Ex. 1 | 3.6 Ex. 27 | 30/175 | 30 min | 1½ hr. |
| 179 | 10.0 Ex. 13 | 9.7 Ex. 4 | 3.8 Ex. 27 | 30/175 | 15 min | 24 hr. |
| 180 | 10.0 Ex. 13 | 11.7 Ex. 5 | 4.3 Ex. 27 | 30/175 | 3 hr | 3 hr. |
| 181 | 10.0 Ex. 13 | 11.7 Ex. 5 | 2.2 Ex. 25 | 30/175 | 12 hr | 3½ hr. |
| 182 | 10.0 Ex. 13 | 8.4 Ex. 6 | 1.8 Ex. 25 | 30/175 | 6 hr | 168 hr. |
| 183 | 10.0 Ex. 13 | 8.4 Ex. 7 | 3.6 Ex. 27 | 30/175 | 3½ hr | 2 hr. |
| 184 | 10.0 Ex. 13 | 8.4 Ex. 7 | 1.8 Ex. 26 | 30/175 | 3¼ hr | 10 min. |
| 185 | 10.0 Ex. 13 | 7.4 Ex. 8 | 1.7 Ex. 27 | 30/175 | 30 min | 10 min. |
| 186 | 10.0 Ex. 13 | 7.4 Ex. 8 | 1.7 Ex. 25 | 30/175 | 2 hr | 24 hr. |
| 187 | 10.0 Ex. 15 | 9.8 Ex. 1 | 1.9 Ex. 27 | 30/175 | 1½ hr | 1 hr. |
| 188 | 10.0 Ex. 15 | 13.5 Ex. 5 | 4.8 Ex. 25 | 30/175 | 2 hr | 2 hr. |
| 189 | 10.0 Ex. 15 | 13.5 Ex. 5 | 4.8 Ex. 26 | 30/175 | 10 min | 3 hr. |
| 190 | 10.0 Ex. 15 | 9.7 Ex. 6 | 3.8 Ex. 27 | 30/175 | 40 min | 96 hr. |
| 191 | 10.0 Ex. 15 | 9.7 Ex. 7 | 3.8 Ex. 27 | 30/175 | 12 hr | 1 hr. |
| 192 | 10.0 Ex. 15 | 9.7 Ex. 7 | 3.8 Ex. 26 | 30/175 | 10 min | 1 hr. |
| 193 | 10.0 Ex. 15 | 8.6 Ex. 8 | 3.6 Ex. 27 | 30/175 | 1½ hr | 7½ hr. |
| 194 | 10.0 Ex. 14 | 11.3 Ex. 1 | 2.1 Ex. 27 | 30/175 | 1½ hr | 1 hr. |
| 195 | 10.0 Ex. 14 | 11.3 Ex. 2 | 4.2 Ex. 25 | 30/175 | 12 hr | 5 min |
| 196 | 10.0 Ex. 14 | 11.0 Ex. 6 | 2.1 Ex. 27 | 30/175 | 2 hr | 3½ hr. |
| 197 | 10.0 Ex. 14 | 11.0 Ex. 6 | 2.1 Ex. 25 | 30/175 | 2½ hr | 5 min. |
| 198 | 10.0 Ex. 14 | 11.0 Ex. 7 | 2.1 Ex. 25 | 30/175 | 10 min | 5 min. |
| 199 | 10.0 Ex. 14 | 9.7 Ex. 8 | 1.9 Ex. 27 | 30/175 | 2½ hr | 1 hr. |

| Ex. No. | Parts of polyepoxide | Parts of polyhydric phenol | Parts of aldehyde condensate | Baking schedule, min./°C. | Film resistance Boiling water | Film resistance 5% aqueous NaOH at 25° C. |
|---|---|---|---|---|---|---|
| 200 | 10.0 Ex. 14 | 14.5 Ex. 3 | 4.5 Ex. 26 | 30/175 | 30 min | 1 hr. |
| 201 | 10.0 Ex. 14 | 14.5 Ex. 3 | 4.5 Ex. 27 | 30/175 | 30 min | 1½ hr. |
| 202 | 1.0 Ex. 14 | 8.0 Ex. 3 | 1.0 Ex. 26 | 30/175 | 8 hr | 30 min. |
| 203 | 8.0 Ex. 15 | 1.0 Ex. 4 | 1.0 Ex. 27 | 30/175 | 8 hr | 52 hr. |
| 204 | 2.5 Ex. 15 | 2.5 Ex. 4 | 5.0 Ex. 26 | 30/175 | 30 min | 30 min. |
| 205 | 1.0 Ex. 15 | 3.0 Ex. 3 | 8.0 Ex. 27 | 30/175 | 30 min | 30 min. |
| 206 | 10.0 Ex. 16 | 3.5 Ex. 1 | 2.6 Ex. 26 | 30/175 | 20 min | 1 hr. |
| 207 | 10.0 Ex. 16 | 3.5 Ex. 2 | 2.6 Ex. 25 | 30/175 | 20 min | 20 min. |
| 208 | 10.0 Ex. 16 | 14.3 Ex. 5 | 4.8 Ex. 25 | 30/175 | 1¼ hr | 2 hr. |
| 209 | 10.0 Ex. 16 | 3.6 Ex. 6 | 2.7 Ex. 27 | 30/175 | 3 hr | 2 hr. |
| 210 | 10.0 Ex. 16 | 3.6 Ex. 6 | 2.7 Ex. 25 | 30/175 | 12 hr | 20 min. |
| 211 | 10.0 Ex. 16 | 3.6 Ex. 7 | 2.7 Ex. 26 | 30/175 | 20 min | 2 hr. |
| 212 | 10.0 Ex. 16 | 4.1 Ex. 9 | 2.8 Ex. 27 | 30/175 | 20 min | 2¾ hr. |
| 213 | 10.0 Ex. 17 | 22.4 Ex. 2 | 6.5 Ex. 25 | 30/175 | 30 min | 15 min. |
| 214 | 10.0 Ex. 17 | 23.0 Ex. 6 | 6.6 Ex. 25 | 30/175 | 12 hr | 3½ hr. |
| 215 | 10.0 Ex. 17 | 23.0 Ex. 7 | 6.6 Ex. 25 | 30/175 | 12 hr | 2¾ hr. |
| 216 | 10.0 Ex. 17 | 25.8 Ex. 8 | 7.2 Ex. 25 | 30/175 | 1¼ hr | 1½ hr. |
| 217 | 10.0 Ex. 17 | 19.9 Ex. 4 | 3.0 Ex. 25 | 30/175 | 3½ hr | 24 hr. |
| 218 | 10.0 Ex. 17 | 17.5 Ex. 3 | 2.7 Ex. 25 | 30/175 | 1 hr | 1 hr. |
| 219 | 1.0 Ex. 16 | 8.0 Ex. 8 | 1.0 Ex. 27 | 30/175 | 8 hr | 20 hr. |
| 220 | 8.0 Ex. 16 | 1.0 Ex. 8 | 1.0 Ex. 27 | 30/175 | 3 hr | 30 hr. |
| 221 | 2.5 Ex. 16 | 2.5 Ex. 2 | 5.0 Ex. 25 | 30/175 | 3 hr | 30 min. |
| 222 | 1.0 Ex. 16 | 1.0 Ex. 5 | 8.0 Ex. 25 | 30/175 | 30 min | 30 min. |
| 223 | 10.0 Ex. 18 | 19.5 Ex. 1 | 5.8 Ex. 27 | 30/175 | 3 hr | 40 min. |
| 224 | 10.0 Ex. 18 | 15.2 Ex. 3 | 5.0 Ex. 27 | 30/175 | 3½ hr | 35 min. |
| 225 | 10.0 Ex. 18 | 17.4 Ex. 4 | 5.4 Ex. 27 | 30/175 | 12 hr | 20 min. |
| 226 | 10.0 Ex. 18 | 17.4 Ex. 5 | 5.4 Ex. 25 | 30/175 | 12 hr | 30 min. |
| 227 | 10.0 Ex. 18 | 17.4 Ex. 5 | 5.4 Ex. 26 | 30/175 | 12 hr | 1 hr. |
| 228 | 10.0 Ex. 18 | 20.0 Ex. 6 | 6.0 Ex. 27 | 30/175 | 10 hr | 5 hr. |
| 229 | 10.0 Ex. 18 | 20.0 Ex. 7 | 6.0 Ex. 27 | 30/175 | 12 hr | 1½ hr. |
| 230 | 10.0 Ex. 18 | 22.6 Ex. 8 | 6.6 Ex. 25 | 30/175 | 12 hr | 168 hr. |
| 231 | 10.0 Ex. 18 | 22.6 Ex. 8 | 6.6 Ex. 26 | 30/175 | 10 min | 22 hr. |
| 232 | 10.0 Ex. 19 | 14.4 Ex. 1 | 4.8 Ex. 27 | 30/175 | 1½ hr | 27 hr. |
| 233 | 10.0 Ex. 19 | 14.4 Ex. 2 | 4.8 Ex. 25 | 30/175 | 7 hr | 18 hr. |
| 234 | 10.0 Ex. 19 | 11.3 Ex. 3 | 4.3 Ex. 26 | 30/175 | 1½ hr | 19 hr. |
| 235 | 10.0 Ex. 19 | 12.9 Ex. 4 | 4.5 Ex. 27 | 30/175 | 1½ hr | 25 hr. |
| 236 | 10.0 Ex. 19 | 10.7 Ex. 5 | 4.1 Ex. 25 | 30/175 | 1½ hr | 18 hr. |
| 237 | 10.0 Ex. 19 | 14.9 Ex. 6 | 4.9 Ex. 27 | 30/175 | 9 hr | 18 hr. |
| 238 | 10.0 Ex. 19 | 14.9 Ex. 6 | 4.9 Ex. 25 | 30/175 | 5 hr | 24 hr. |
| 239 | 10.0 Ex. 19 | 14.9 Ex. 7 | 5.3 Ex. 26 | 30/175 | 1½ hr | 29 hr. |
| 240 | 10.0 Ex. 19 | 16.9 Ex. 9 | 5.3 Ex. 26 | 30/175 | 8 hr | 24 hr. |
| 241 | 1.0 Ex. 18 | 8.0 Ex. 5 | 1.0 Ex. 27 | 30/175 | 8 hr | 30 min. |
| 242 | 8.0 Ex. 18 | 1.0 Ex. 9 | 1.0 Ex. 27 | 30/175 | 7 hr | 24 hr. |
| 243 | 2.5 Ex. 18 | 2.5 Ex. 8 | 5.0 Ex. 27 | 30/175 | 30 min | 72 hr. |
| 244 | 1.0 Ex. 18 | 1.0 Ex. 3 | 8.0 Ex. 25 | 30/175 | 5 hr | 20 hr. |
| 245 | 10.0 Epon 864 | 8.7 Ex. 1 | 3.7 Ex. 21 | 30/175 | 12 hr | 168 hr. |
| 246 | do | 8.7 Ex. 1 | 3.7 Ex. 22 | 30/175 | 12 hr | 168 hr. |
| 247 | do | 8.7 Ex. 1 | 1.8 Ex. 22 | 30/175 | 12 hr | 168 hr. |
| 248 | do | 8.7 Ex. 1 | 10.8 Ex. 20 | 30/175 | 12 hr | 96 hr. |
| 249 | do | 8.7 Ex. 1 | 1.8 Ex. 21 | 30/175 | 12 hr | 102 hr. |
| 250 | do | 8.7 Ex. 2 | 3.6 Ex. 21 | 30/175 | 12 hr | 24 hr. |
| 251 | do | 6.8 Ex. 3 | 3.2 Ex. 22 | 30/175 | 4½ hr | 30 hr. |
| 252 | do | 6.8 Ex. 3 | 3.2 Ex. 21 | 30/175 | 5½ hr | 168 hr. |
| 253 | do | 6.8 Ex. 3 | 1.6 Ex. 24 | 30/175 | 1½ hr | 168 hr. |
| 254 | do | 6.8 Ex. 3 | 9.6 Ex. 20 | 30/175 | 4½ hr | 58 hr. |
| 255 | do | 3.9 Ex. 4 | 5.4 Ex. 20 | 30/175 | 8½ hr | 168 hr. |
| 256 | do | 8.9 Ex. 6 | 5.4 Ex. 20 | 30/175 | 14 hr | 168 hr. |
| 257 | do | 8.9 Ex. 6 | 1.9 Ex. 22 | 30/175 | 14½ hr | 168 hr. |
| 258 | do | 8.9 Ex. 6 | 3.2 Ex. 24 | 30/175 | 6 hr | 168 hr. |
| 259 | do | 8.9 Ex. 12 | 5.4 Ex. 20 | 30/175 | 12 hr | 168 hr. |
| 260 | do | 8.9 Ex. 12 | 3.7 Ex. 21 | 30/175 | 12 hr | 168 hr. |
| 261 | do | 8.9 Ex. 12 | 3.7 Ex. 23 | 30/175 | 6 hr | 168 hr. |
| 262 | do | 10.1 Ex. 8 | 4.0 Ex. 22 | 30/175 | 30 min | 168 hr. |
| 263 | do | 10.1 Ex. 8 | 6.0 Ex. 20 | 30/175 | 12 hr | 168 hr. |
| 264 | do | 10.0 Ex. 8 | 2.0 Ex. 24 | 30/175 | 30 min | 168 hr. |
| 265 | 10.0 Epon 1001 | 6.1 Ex. 1 | 4.8 Ex. 20 | 30/175 | 12 hr | 168 hr. |
| 266 | do | 6.1 Ex. 1 | 1.6 Ex. 21 | 30/175 | 12 hr | 168 hr. |
| 267 | do | 6.1 Ex. 1 | 1.6 Ex. 22 | 30/175 | 12 hr | 168 hr. |
| 268 | do | 6.1 Ex. 2 | 3.2 Ex. 21 | 30/175 | 3½ hr | 73 hr. |
| 269 | do | 6.2 Ex. 6 | 4.8 Ex. 20 | 30/175 | 14½ hr | 168 hr. |
| 270 | do | 6.2 Ex. 6 | 3.2 Ex. 21 | 30/175 | 6½ hr | 6½ hr. |
| 271 | do | 6.2 Ex. 7 | 3.2 Ex. 22 | 30/175 | 12 hr | 168 hr. |
| 272 | do | 6.9 Ex. 8 | 3.4 Ex. 21 | 30/175 | 30 min | 168 hr. |
| 273 | do | 6.9 Ex. 9 | 3.3 Ex. 20 | 30/175 | 1½ hr | 168 hr. |
| 274 | 10.0 Epon 1004 | 3.3 Ex. 1 | 1.3 Ex. 22 | 30/175 | 12 hr | 192 hr. |
| 275 | do | 3.3 Ex. 1 | 5.2 Ex. 20 | 30/175 | 2 hr | 130 hr. |
| 276 | do | 3.3 Ex. 2 | 2.2 Ex. 20 | 30/175 | 10 min | 58 hr. |
| 277 | do | 3.3 Ex. 2 | 4.4 Ex. 20 | 30/175 | 30 min | 58 hr. |
| 278 | do | 3.3 Ex. 2 | 1.3 Ex. 22 | 30/175 | 12 hr | 168 hr. |
| 279 | do | 2.6 Ex. 3 | 4.3 Ex. 20 | 30/175 | 20 min | 168 hr. |
| 280 | do | 2.6 Ex. 3 | 2.6 Ex. 21 | 30/175 | 10 min | 58 hr. |
| 281 | do | 2.9 Ex. 4 | 2.2 Ex. 20 | 30/175 | 15 min | 168 hr. |
| 282 | do | 2.0 Ex. 4 | 2.6 Ex. 21 | 30/175 | 15 min | 168 hr. |
| 283 | do | 2.2 Ex. 5 | 2.4 Ex. 21 | 30/175 | 2 hr | 168 hr. |
| 284 | do | 3.4 Ex. 6 | 2.7 Ex. 22 | 30/175 | 1 hr | 168 hr. |
| 285 | do | 3.4 Ex. 6 | 3.9 Ex. 24 | 30/175 | 25 min | 168 hr. |
| 286 | do | 3.4 Ex. 6 | 3.9 Ex. 23 | 30/175 | 6½ hr | 168 hr. |
| 287 | do | 3.4 Ex. 7 | 2.1 Ex. 20 | 30/175 | 12 hr | 168 hr. |
| 288 | do | 3.8 Ex. 8 | 2.7 Ex. 22 | 30/175 | 15 min | 168 hr. |
| 289 | do | 3.8 Ex. 8 | 2.7 Ex. 23 | 30/175 | 25 min | 168 hr. |
| 290 | do | 3.8 Ex. 9 | 2.3 Ex. 20 | 30/175 | 6½ hr | 168 hr. |
| 291 | do | 3.8 Ex. 9 | 2.9 Ex. 24 | 30/175 | 15 min | 168 hr. |
| 292 | 10.0 Epon 1007 | 1.7 Ex. 1 | 2.1 Ex. 20 | 30/175 | 20 min | 192 hr. |
| 293 | do | 1.7 Ex. 1 | 5.1 Ex. 24 | 30/175 | 25 min | 192 hr. |
| 294 | do | 1.7 Ex. 3 | 2.3 Ex. 22 | 30/175 | 15 min | 45 hr. |
| 295 | do | 1.5 Ex. 4 | 2.3 Ex. 21 | 30/175 | 15 min | 168 hr. |
| 296 | do | 1.5 Ex. 4 | 2.3 Ex. 24 | 30/175 | 25 min | 168 hr. |
| 297 | do | 1.7 Ex. 6 | 3.7 Ex. 20 | 30/175 | 14½ hr | 67 hr. |
| 298 | do | 1.7 Ex. 7 | 2.3 Ex. 24 | 30/175 | 15 min | 168 hr. |
| 299 | do | 1.9 Ex. 8 | 2.4 Ex. 21 | 30/175 | 10 min | 168 hr. |
| 300 | do | 1.9 Ex. 8 | 2.4 Ex. 24 | 30/175 | 15 min | 168 hr. |
| 301 | do | 1.9 Ex. 9 | 2.3 Ex. 22 | 30/175 | 35 min | 168 hr. |

| Ex. No. | Parts of polyepoxide | Parts of polyhydric phenol | Parts of aldehyde condensate | Baking schedule, min./°C. | Film resistance Boiling water | Film resistance 5% aqueous NaOH at 25° C. |
|---|---|---|---|---|---|---|
| 302 | 8.0 Epon 1007 | 1.0 Ex. 5 | 1.0 Ex. 20 | 30/175 | 5 hr | 72 hr. |
| 303 | 1.0 Epon 864 | 8.0 Ex. 2 | 1.0 Ex. 21 | 30/175 | 8 hr | 20 hr. |
| 304 | 2.5 Epon 864 | 2.5 Ex. 5 | 5.0 Ex. 22 | 30/175 | 5 hr | 72 hr. |
| 305 | 1.0 Epon 864 | 1.0 Ex. 9 | 8.0 Ex. 22 | 30/175 | 5 hr | 24 hr. |
| 306 | 10.0 Ex. 13 | 8.6 Ex. 1 | 3.6 Ex. 22 | 30/150 | 5 min | 5 min. |
| 307 | 10.0 Ex. 13 | 8.6 Ex. 1 | 2.8 Ex. 20 | 30/150 | 6½ hr | 6½ hr. |
| 308 | 10.0 Ex. 13 | 11.7 Ex. 5 | 6.6 Ex. 20 | 30/150 | 45 min | 1 hr. |
| 309 | 10.0 Ex. 13 | 8.4 Ex. 6 | 3.4 Ex. 22 | 30/150 | 1 hr | 34 hr. |
| 310 | 10.0 Ex. 13 | 8.4 Ex. 6 | 3.4 Ex. 24 | 30/150 | 30 min | 2½ hr. |
| 311 | 10.0 Ex. 13 | 8.4 Ex. 6 | 3.4 Ex. 23 | 30/150 | 12 hr | 30 min. |
| 312 | 10.0 Ex. 13 | 8.4 Ex. 7 | 1.8 Ex. 21 | 30/150 | 1 hr | 25 min. |
| 313 | 10.0 Ex. 13 | 7.4 Ex. 8 | 2.6 Ex. 20 | 30/150 | 30 min | 10 min. |
| 314 | 10.0 Ex. 13 | 7.4 Ex. 8 | 3.4 Ex. 24 | 30/150 | 12 hr | 2½ hr. |
| 315 | 10.0 Ex. 13 | 7.4 Ex. 9 | 1.7 Ex. 21 | 30/150 | 3 hr | 1 hr. |
| 316 | 10.0 Ex. 13 | 7.4 Ex. 9 | 3.4 Ex. 22 | 30/150 | 3 hr | 168 hr. |
| 317 | 10.0 Ex. 14 | 11.3 Ex. 1 | 3.3 Ex. 20 | 30/150 | 12 hr | 5 min. |
| 318 | 10.0 Ex. 14 | 11.3 Ex. 1 | 4.3 Ex. 22 | 30/150 | 2¾ hr | 5 min. |
| 319 | 10.0 Ex. 14 | 11.3 Ex. 2 | 4.2 Ex. 21 | 30/150 | 5 min | 10 min. |
| 320 | 10.0 Ex. 14 | 14.5 Ex. 3 | 3.9 Ex. 20 | 30/150 | 4½ hr | 1 hr. |
| 321 | 10.0 Ex. 14 | 14.5 Ex. 3 | 2.5 Ex. 24 | 30/150 | 4½ hr | 2½ hr. |
| 322 | 10.0 Ex. 14 | 14.5 Ex. 3 | 2.5 Ex. 23 | 30/150 | 4½ hr | 96 hr. |
| 323 | 10.0 Ex. 14 | 11.0 Ex. 6 | 6.6 Ex. 20 | 30/150 | 3 hr | 25 min. |
| 324 | 10.0 Ex. 14 | 11.0 Ex. 7 | 2.1 Ex. 22 | 30/150 | 20 min | 5 min. |
| 325 | 10.0 Ex. 14 | 9.7 Ex. 8 | 3.1 Ex. 20 | 30/150 | 10 min | 5 min. |
| 326 | 10.0 Ex. 14 | 9.7 Ex. 8 | 3.8 Ex. 22 | 30/150 | 25 min | 5 min. |
| 327 | 10.0 Ex. 14 | 9.7 Ex. 9 | 1.9 Ex. 21 | 30/150 | 25 min | 6½ hr. |
| 328 | 10.0 Ex. 15 | 9.8 Ex. 1 | 3.0 Ex. 20 | 30/150 | 2½ hr | 5 min. |
| 329 | 10.0 Ex. 15 | 9.8 Ex. 1 | 3.8 Ex. 22 | 30/150 | 12 hr | 10 min. |
| 330 | 10.0 Ex. 15 | 9.8 Ex. 2 | 3.0 Ex. 20 | 30/150 | 12 hr | 10 min. |
| 331 | 10.0 Ex. 15 | 13.5 Ex. 5 | 4.8 Ex. 22 | 30/150 | 5 min | 1 hr. |
| 332 | 10.0 Ex. 15 | 9.7 Ex. 6 | 5.8 Ex. 20 | 30/150 | 12 hr | 3 hr. |
| 333 | 10.0 Ex. 15 | 9.7 Ex. 6 | 3.8 Ex. 22 | 30/150 | 12 hr | 1 hr. |
| 334 | 10.0 Ex. 15 | 9.7 Ex. 7 | 3.8 Ex. 21 | 30/150 | 10 min | 10 min. |
| 335 | 10.0 Ex. 15 | 9.7 Ex. 7 | 1.9 Ex. 24 | 30/150 | 10 min | 2½ hr. |
| 336 | 10.0 Ex. 15 | 8.6 Ex. 8 | 3.6 Ex. 21 | 30/150 | 10 min | 1 hr. |
| 337 | 10.0 Ex. 15 | 8.6 Ex. 8 | 3.6 Ex. 22 | 30/150 | 10 min | 1 hr. |
| 338 | 10.0 Ex. 15 | 5.6 Ex. 4 | 3.0 Ex. 21 | 30/150 | 30 min | 15 hr. |
| 339 | 8.0 Ex. 15 | 1.0 Ex. 3 | 1.0 Ex. 20 | 30/175 | 2 hr | 1 hr. |
| 340 | 1.0 Ex. 15 | 8.0 Ex. 8 | 1.0 Ex. 21 | 30/175 | 30 min | 30 min. |
| 341 | 2.5 Ex. 15 | 2.5 Ex. 4 | 5.0 Ex. 21 | 30/175 | 30 min | 20 hr. |
| 342 | 1.0 Ex. 15 | 1.0 Ex. 4 | 8.0 Ex. 21 | 30/175 | 8 hr | 2 hr. |
| 343 | 10.0 Ex. 16 | 3.5 Ex. 1 | 2.6 Ex. 21 | 30/175 | 1½ hr | 2 hr. |
| 344 | 10.0 Ex. 16 | 3.5 Ex. 1 | 2.6 Ex. 23 | 30/175 | 1 hr | 20 min. |
| 345 | 10.0 Ex. 16 | 3.5 Ex. 2 | 2.6 Ex. 22 | 30/175 | 1½ hr | 20 min. |
| 346 | 10.0 Ex. 16 | 3.1 Ex. 4 | 4.0 Ex. 20 | 30/175 | 20 min | 2¾ hr. |
| 347 | 10.0 Ex. 16 | 3.1 Ex. 4 | 2.6 Ex. 24 | 30/175 | 10 min | 22 hr. |
| 348 | 10.0 Ex. 16 | 3.6 Ex. 6 | 2.7 Ex. 21 | 30/200 | 1½ hr | 22 hr. |
| 349 | 10.0 Ex. 16 | 3.6 Ex. 7 | 2.7 Ex. 22 | 30/200 | 6 hr | 1 hr. |
| 350 | 10.0 Ex. 16 | 4.3 Ex. 8 | 4.3 Ex. 20 | 30/200 | 30 min | 20 min. |
| 351 | 10.0 Ex. 16 | 4.1 Ex. 9 | 2.8 Ex. 22 | 30/200 | 1¼ hr | 24 hr. |
| 352 | 10.0 Ex. 17 | 22.4 Ex. 2 | 6.5 Ex. 21 | 30/200 | 30 min | 20 min. |
| 353 | 10.0 Ex. 17 | 23.0 Ex. 6 | 6.6 Ex. 22 | 30/200 | 8 hr | 20 hr. |
| 354 | 10.0 Ex. 17 | 23.0 Ex. 6 | 6.6 Ex. 24 | 30/200 | 12 hr | 23 hr. |
| 355 | 10.0 Ex. 17 | 23.0 Ex. 7 | 6.6 Ex. 22 | 30/200 | 45 min | 1 hr. |
| 356 | 10.0 Ex. 17 | 23.0 Ex. 7 | 6.6 Ex. 23 | 30/200 | 7 hr | 1 hr. |
| 357 | 10.0 Ex. 17 | 25.8 Ex. 8 | 7.2 Ex. 22 | 30/200 | 40 min | 1 hr. |
| 358 | 10.0 Ex. 17 | 25.8 Ex. 9 | 7.2 Ex. 21 | 30/200 | 40 min | 1½ hr. |
| 359 | 10.0 Ex. 17 | 34.5 Ex. 3 | 10.1 Ex. 22 | 30/200 | 12 hr | 2½ hr. |
| 360 | 8.0 Ex. 16 | 1.0 Ex. 6 | 1.0 Ex. 21 | 30/175 | 30 min | 72 hr. |
| 361 | 1.0 Ex. 16 | 8.0 Ex. 9 | 1.0 Ex. 21 | 30/175 | 30 min | 26 hr. |
| 362 | 2.5 Ex. 16 | 2.5 Ex. 9 | 5.0 Ex. 21 | 30/175 | 30 min | 30 hr. |
| 363 | 1.0 Ex. 16 | 1.0 Ex. 4 | 8.0 Ex. 21 | 30/175 | 30 min | 30 min. |
| 364 | 10.0 Ex. 18 | 19.5 Ex. 1 | 8.8 Ex. 20 | 30/175 | 3 hr | 1 hr. |
| 365 | 10.0 Ex. 18 | 19.5 Ex. 1 | 5.8 Ex. 22 | 30/175 | 3 hr | 30 min. |
| 366 | 10.0 Ex. 18 | 19.5 Ex. 2 | 5.8 Ex. 22 | 30/175 | 3 hr | 35 min. |
| 367 | 10.0 Ex. 18 | 15.2 Ex. 3 | 5.0 Ex. 21 | 30/175 | 12 hr | 1 hr. |
| 368 | 10.0 Ex. 18 | 15.2 Ex. 3 | 5.0 Ex. 22 | 30/175 | 12 hr | 2¾ hr. |
| 369 | 10.0 Ex. 18 | 17.4 Ex. 4 | 5.4 Ex. 21 | 30/175 | 12 hr | 20 min. |
| 370 | 10.0 Ex. 18 | 17.4 Ex. 4 | 5.4 Ex. 22 | 30/175 | 12 hr | 20 min. |
| 371 | 10.0 Ex. 18 | 17.4 Ex. 5 | 8.2 Ex. 20 | 30/175 | 12 hr | 2 hr. |
| 372 | 10.0 Ex. 18 | 20.0 Ex. 6 | 9.0 Ex. 20 | 30/175 | 12 hr | 168 hr. |
| 373 | 10.0 Ex. 18 | 20.0 Ex. 6 | 6.0 Ex. 21 | 30/175 | 12 hr | 2 hr. |
| 374 | 10.0 Ex. 18 | 20.0 Ex. 7 | 9.0 Ex. 20 | 30/175 | 12 hr | 22 hr. |
| 375 | 10.0 Ex. 18 | 20.0 Ex. 7 | 6.0 Ex. 22 | 30/175 | 12 hr | 1⅙ hr. |
| 376 | 10.0 Ex. 18 | 22.6 Ex. 8 | 6.6 Ex. 21 | 30/175 | 3 hr | 40 min. |
| 377 | 10.0 Ex. 18 | 22.6 Ex. 9 | 9.6 Ex. 20 | 30/175 | 12 hr | 168 hr. |
| 378 | 10.0 Ex. 18 | 22.6 Ex. 9 | 6.6 Ex. 22 | 30/175 | 12 hr | 168 hr. |
| 379 | 10.0 Ex. 19 | 14.4 Ex. 1 | 7.2 Ex. 20 | 30/175 | 7 hr | 24 hr. |
| 380 | 10.0 Ex. 19 | 14.4 Ex. 2 | 4.8 Ex. 22 | 30/175 | 10 hr | 19 hr. |
| 381 | 10.0 Ex. 19 | 12.9 Ex. 4 | 7.0 Ex. 20 | 30/175 | 8½ hr | 24 hr. |
| 382 | 10.0 Ex. 19 | 10.7 Ex. 5 | 4.1 Ex. 22 | 30/175 | 1½ hr | 18 hr. |
| 383 | 10.0 Ex. 19 | 14.9 Ex. 6 | 7.5 Ex. 20 | 30/175 | 9 hr | 30 hr. |
| 384 | 10.0 Ex. 19 | 14.9 Ex. 7 | 4.9 Ex. 21 | 30/175 | 1½ hr | 24 hr. |
| 385 | 10.0 Ex. 19 | 14.9 Ex. 7 | 4.9 Ex. 24 | 30/175 | 12 hr | 19 hr. |
| 386 | 10.0 Ex. 19 | 16.9 Ex. 8 | 5.3 Ex. 22 | 30/175 | 2½ hr | 29 hr. |
| 387 | 10.0 Ex. 19 | 16.9 Ex. 8 | 5.3 Ex. 23 | 30/175 | 6 hr | 19 hr. |
| 388 | 10.0 Ex. 19 | 16.9 Ex. 9 | 8.2 Ex. 20 | 30/175 | 12 hr | 18 hr. |
| 389 | 10.0 Ex. 19 | 16.9 Ex. 9 | 5.3 Ex. 23 | 30/175 | 12 hr | 18 hr. |
| 390 | 1.0 Ex. 18 | 8.0 Ex. 2 | 1.0 Ex. 22 | 30/175 | 5½ hr | 20 hr. |
| 391 | 2.5 Ex. 18 | 2.5 Ex. 6 | 5.0 Ex. 22 | 30/175 | 30 min | 52 hr. |
| 392 | 1.0 Ex. 18 | 1.0 Ex. 6 | 8.0 Ex. 22 | 30/175 | 8 hr | 20 hr. |

It should be appreciated that while there are above disclosed but a limited number of embodiments of this invention, it is possible to produce still other embodiments without departing from the inventive concept herein disclosed.

It is claimed and desired to secure by Letters Patent:

1. A composition of matter comprising the insoluble, infusible reaction product of (A) a mixed polyamide of (1) a pentanoic acid consisting essentially of 4,4-bis(4-hydroxyaryl)pentanoic acid wherein the hydroxyaryl radical is a hydroxyphenyl radical and is free from substituents other than alkyl groups of from 1–5 carbon atoms, (2) at least one additional carboxylic acid, and (3) a polyamine wherein at least two of the amino groups each contain at least one amino hydrogen, and the amino groups are the sole amide forming groups, and (B) a polyepoxide containing an average of more than one epoxide group per molecule and being free from functional groups reactive with (A) other than hydroxyl, carboxyl and epoxide, and wherein the epoxy oxygen atoms bridge adjacent carbon atoms, and with the active hydrogen groups of the polyamide of (A) and the epoxide groups of (B) present on an equivalent ratio of from 1:6 to 6:1.

2. The composition of claim 1 wherein the active hydrogen groups of the polyamide of (A) and the epoxide groups of (B) are present on an equivalent ratio of from 2:1 to 1:2.

3. The composition of claim 1 wherein the pentanoic acid of (A–1) consists essentially of 4,4-bis(4-hydroxyaryl)pentanoic acid wherein the hydroxyaryl radical is a hydroxyphenyl radical and is free from substituents other than alkyl groups of one carbon atom.

4. The composition of claim 1 wherein the pentanoic acid of (A–1) is 4,4-bis(4-hydroxyphenyl)pentanoic acid.

5. The composition of claim 4 wherein the polyamine of (A–3) is aliphatic.

6. The composition of claim 4 wherein the polyamine of (A–3) is aromatic.

7. The composition of claim 4 wherein the additional carboxylic acid of (A–2) is an unsaturated monocarboxylic acid.

8. The composition of claim 4 wherein the additional carboxylic acid of (A–2) is a saturated monocarboxylic acid.

9. The composition of claim 4 wherein (B) is a complex resinous epoxide, said complex resinous epoxide being a polymeric polyhydric alcohol having aromatic nuclei alternating with and coupled through ether oxygen to intermediate and terminal aliphatic chains, the intermediate chains having hydroxyl groups and the terminal chains having epoxide groups, said complex resinous epoxide having an average of more than one epoxide group per molecule and being free from functional groups other than hydroxyl and epoxide, wherein said epoxy oxygen bridges adjacent carbon atoms.

10. The composition of claim 4 wherein (B) is a polyepoxide polyester of tetrahydrophthalic acid and a glycol, said epoxy oxygen bridging adjacent carbon atoms on the tetrahydrophthalic acid residue.

11. The composition of claim 4 wherein (B) is an aliphatic polyepoxide, said polyepoxide having functional groups selected from the group consisting of (1) epoxide groups and (2) epoxide and hydroxyl groups wherein said epoxy oxygen bridges adjacent carbon atoms.

12. A composition of matter comprising the insoluble, infusible reaction product of (A) a mixed polyamide of (1) a pentanoic acid having the structure

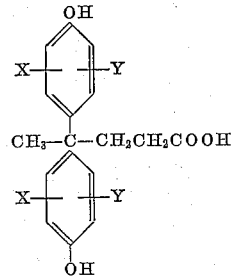

wherein X and Y are selected from the group consisting of hydrogen and alkyl groups of 1–5 carbon atoms, (2) at least one additional carboxylic acid, and (3) a polyamine wherein at least two of the amino groups each contain at least one amino hydrogen and the amino groups are the sole amide forming groups, and (B) a polyepoxide containing an average of more than one epoxide group per molecule and being free from functional groups reactive with (A) other than hydroxyl, carboxyl and epoxide, wherein the epoxy oxygen atoms bridge adjacent carbon atoms and with the active hydrogen groups of the polyamide of (A) and the epoxide groups of (B) present on an equivalent ratio of from 1:6 to 6:1.

13. A composition of matter comprising the insoluble, infusible reaction product of (A) a mixed polyamide of (1) a pentanoic acid consisting essentially of 4,4-bis(4-hydroxyaryl)pentanoic acid wherein the hydroxyaryl radical is a hydroxyphenyl radical and is free from substituents other than alkyl groups of from 1–5 carbon atoms, (2) at least one additional carboxylic acid, and (3) a polyamine wherein at least two of the amino groups each contain at least one amino hydrogen and the amino groups are the sole amide forming groups, (B) a polyepoxide containing an average of more than one epoxide group per molecule and being free from functional groups reactive with (A) and (C) other than hydroxyl, carboxyl and epoxide, wherein the epoxy oxygen atoms bridge adjacent carbon atoms and with the active hydrogen groups of the polyamide of (A) and the epoxide groups of (B) present on an equivalent ratio of from 1:6 to 6:1 and (C) up to about 70% by weight of the fusible condensation product of formaldehyde and a phenol.

14. The composition of claim 13 wherein the pentanoic acid of (A–1) is 4,4-bis(4-hyroxyphenyl)pentanoic acid.

15. The composition of claim 14 wherein the polyamine of (A–3) is aliphatic.

16. The composition of claim 14 wherein the additional carboxylic acid of (A–2) is an unsaturated monocarboxylic acid.

17. A composition of matter comprising the insoluble, infusible reaction product of (A) a mixed polyamide of (1) a pentanoic acid consisting essentially of 4,4-bis(4-hydroxyaryl)pentanoic acid wherein the hyroxyaryl radical is a hydroxyphenyl radical and is free from substituents other than alkyl groups of from 1–5 carbon atoms, (2) at least one additional carboxylic acid, and (3) a polyamine wherein at least two of the amino groups each contain at least one amino hydrogen and the amino groups are the sole amide forming groups, (B) a polyepoxide containing an average of more than one epoxide group per molecule and being free from functional groups reactive with (A) and (C) other than hydroxyl, carboxyl and epoxide, and wherein the epoxy oxygen atoms bridge adjacent carbon atoms and with the active hydrogen groups of the polyamide of (A) and the epoxide groups of (B) present on an equivalent ratio of from 1:6 to 6:1, and (C) up to about 70% by weight of the fusible condensation product of formaldehyde and an organic ammonia derivative containing at least one hydrogen atom attached to a nitrogen atom.

18. The composition of claim 17 wherein the pentanoic acid of (A–1) is 4,4-bis(4-hyrdoxyphenyl)pentanoic acid.

19. The composition of claim 18 wherein the polyamine of (A–3) is aliphatic.

20. The composition of claim 18 wherein the additional carboxylic acid of (A–2) is an unsaturated monocarboxylic acid.

References Cited in the file of this patent
UNITED STATES PATENTS

| | | |
|---|---|---|
| 2,279,745 | Stevenson | Apr. 14, 1942 |
| 2,322,240 | Kropa | June 22, 1943 |
| 2,589,254 | Greenlee | Mar. 18, 1952 |
| 2,705,223 | Renfrew | Mar. 29, 1955 |
| 2,760,944 | Greenlee | Aug. 28, 1956 |

OTHER REFERENCES

Bader: J. American Chem. Soc., vol. 76, pp. 4465–4466 (1954). (Copy in Scientific Library.)

Charlton: Modern Plastics, September 1954, pp. 155–157, 160–161, 240–243. (Copy in Scientific Library.)

UNITED STATES PATENT OFFICE
CERTIFICATE OF CORRECTION

Patent No. 2,907,728                                October 6, 1959

Sylvan O. Greenlee

It is hereby certified that error appears in the printed specification of the above numbered patent requiring correction and that the said Letters Patent should read as corrected below.

Column 3, lines 32 and 33, for "diphenolic acids" read -- Diphenolic Acids --; column 4, line 62, for "unsaturated" read -- saturated --; column 10, the extreme lower right-hand portion of Equation VI, the triepoxide should appear as shown below instead of as in the patent:

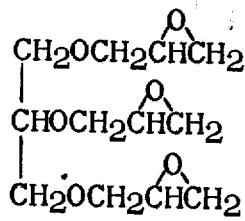

columns 19 and 20, in the table, third column thereof, opposite Ex. No. 60" for "60.2 Ex. 22" read -- 60.2 Ex. 11 --; column 8, line 37, for "the hyroxyaryl" read -- the hydroxyaryl --; line 56, for "(4-hyrdoxyphenyl)" read -- (4-hydroxyphenyl) --.

Signed and sealed this 2nd day of August 1960.

(SEAL)
Attest:

KARL H. AXLINE                                ROBERT C. WATSON
Attesting Officer                           Commissioner of Patents